(12) United States Patent
Zohar et al.

(10) Patent No.: US 7,477,949 B2
(45) Date of Patent: Jan. 13, 2009

(54) GRAPHIC USER INTERFACE FOR A STORAGE SYSTEM

(75) Inventors: Ofir Zohar, Alfe-Menashe (IL); Amihay Birenboim, Tel Aviv (IL); Yaron Revah, Tel Aviv (IL); Haim Helman, Herzelya (IL); Dror Cohen, Tel Aviv (IL); Shemer Schwartz, Tel Aviv (IL); Efri Zeidner, Kiryat Mozkin (IL)

(73) Assignee: XIV Ltd., Tel-Aviv (IL)

( * ) Notice: Subject to any disclaimer, the term of this patent is extended or adjusted under 35 U.S.C. 154(b) by 430 days.

(21) Appl. No.: 11/429,910

(22) Filed: May 8, 2006

(65) Prior Publication Data

US 2006/0267984 A1    Nov. 30, 2006

Related U.S. Application Data

(63) Continuation-in-part of application No. 11/090,444, filed on Mar. 24, 2005, now Pat. No. 7,293,116.

(51) Int. Cl.
G05B 11/01 (2006.01)
G05B 15/00 (2006.01)
G06F 3/00 (2006.01)

(52) U.S. Cl. .......................... 700/17; 700/83; 715/700; 715/705

(58) Field of Classification Search ................... 700/17, 700/83; 715/700, 705

See application file for complete search history.

(56) References Cited

U.S. PATENT DOCUMENTS

| | | | | |
|---|---|---|---|---|
| 6,480,901 | B1 * | 11/2002 | Weber et al. ................. | 709/246 |
| 6,538,669 | B1 * | 3/2003 | Lagueux et al. ............. | 715/764 |
| 6,751,758 | B1 | 6/2004 | Alipui et al. | |
| 6,839,747 | B1 * | 1/2005 | Blumenau et al. ........... | 709/223 |
| 6,845,344 | B1 | 1/2005 | Lally et al. | |
| 6,845,395 | B1 | 1/2005 | Blumenau et al. | |
| 6,966,033 | B1 * | 11/2005 | Gasser et al. ................ | 715/738 |
| 2005/0091369 | A1 * | 4/2005 | Jones .......................... | 709/224 |

* cited by examiner

*Primary Examiner*—Ronald D Hartman, Jr.
(74) *Attorney, Agent, or Firm*—Katten Muchin Rosenman LLP

(57) ABSTRACT

A method for interfacing with a storage system. The storage system has a plurality of elements having a visible relationship with each other, and the storage system is coupled to a system control unit including a display. The method includes: drawing an image of the elements on the display, the image showing the visible relationship, and modifying an appearance of one of the elements in the image to represent a property of the element. The method further includes, in response to a first input from a user of the storage system to the system control unit, drawing an enlarged image of the element and representing the property in the enlarged image. The method also includes, in response to a second input from a user of the storage system to the control unit with respect to the enlarged image, representing a further property of the element in the enlarged image.

12 Claims, 20 Drawing Sheets

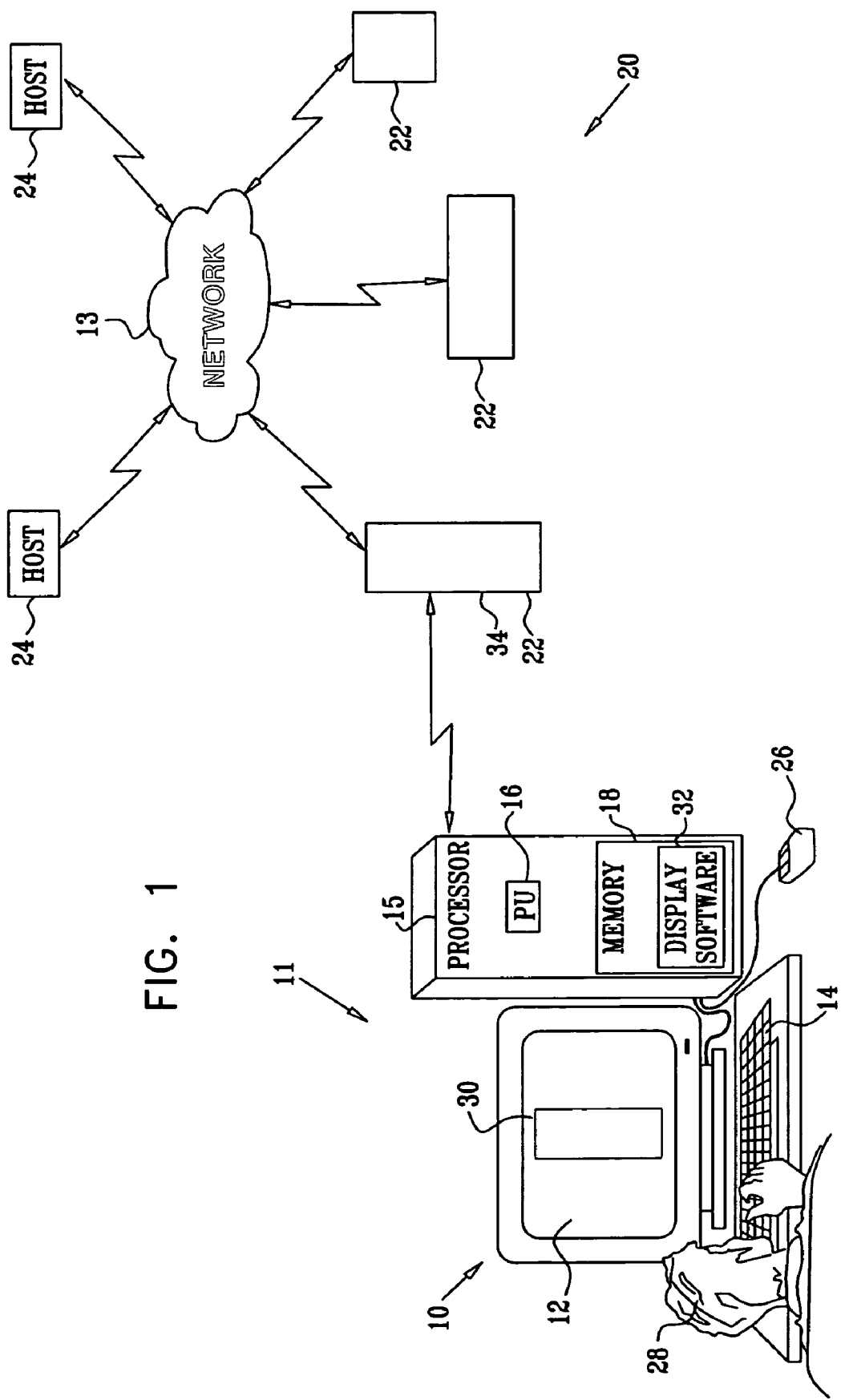

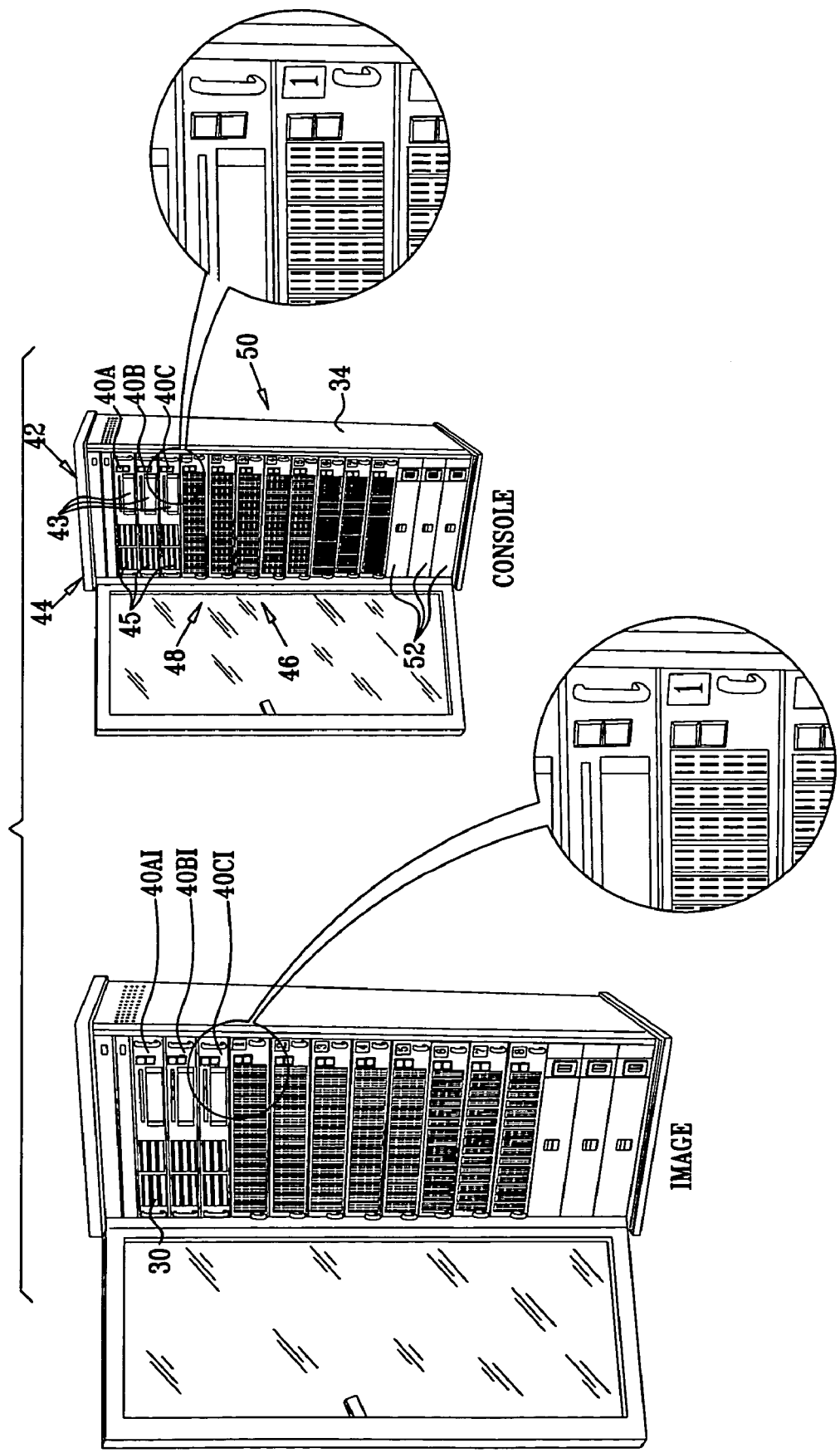

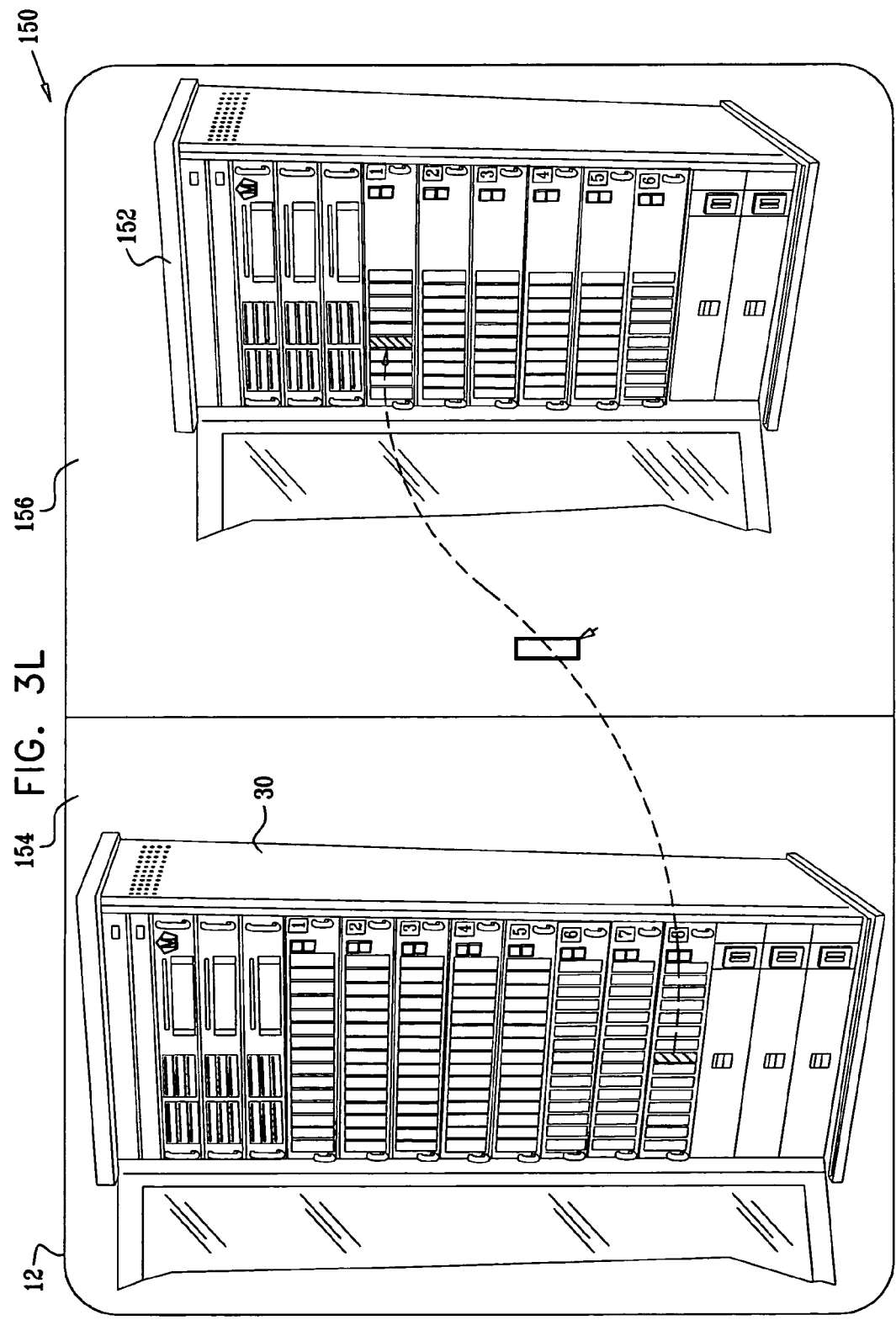

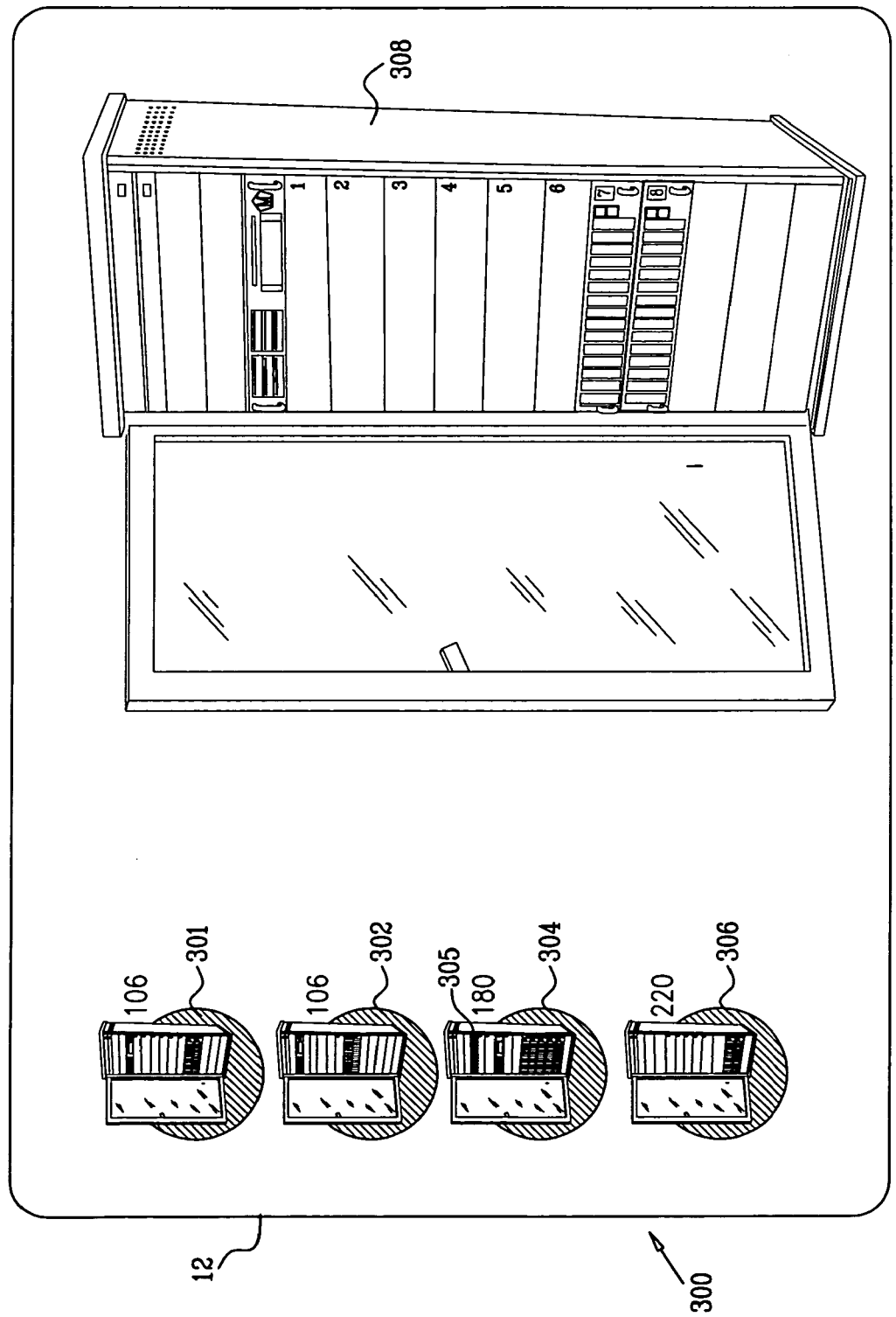

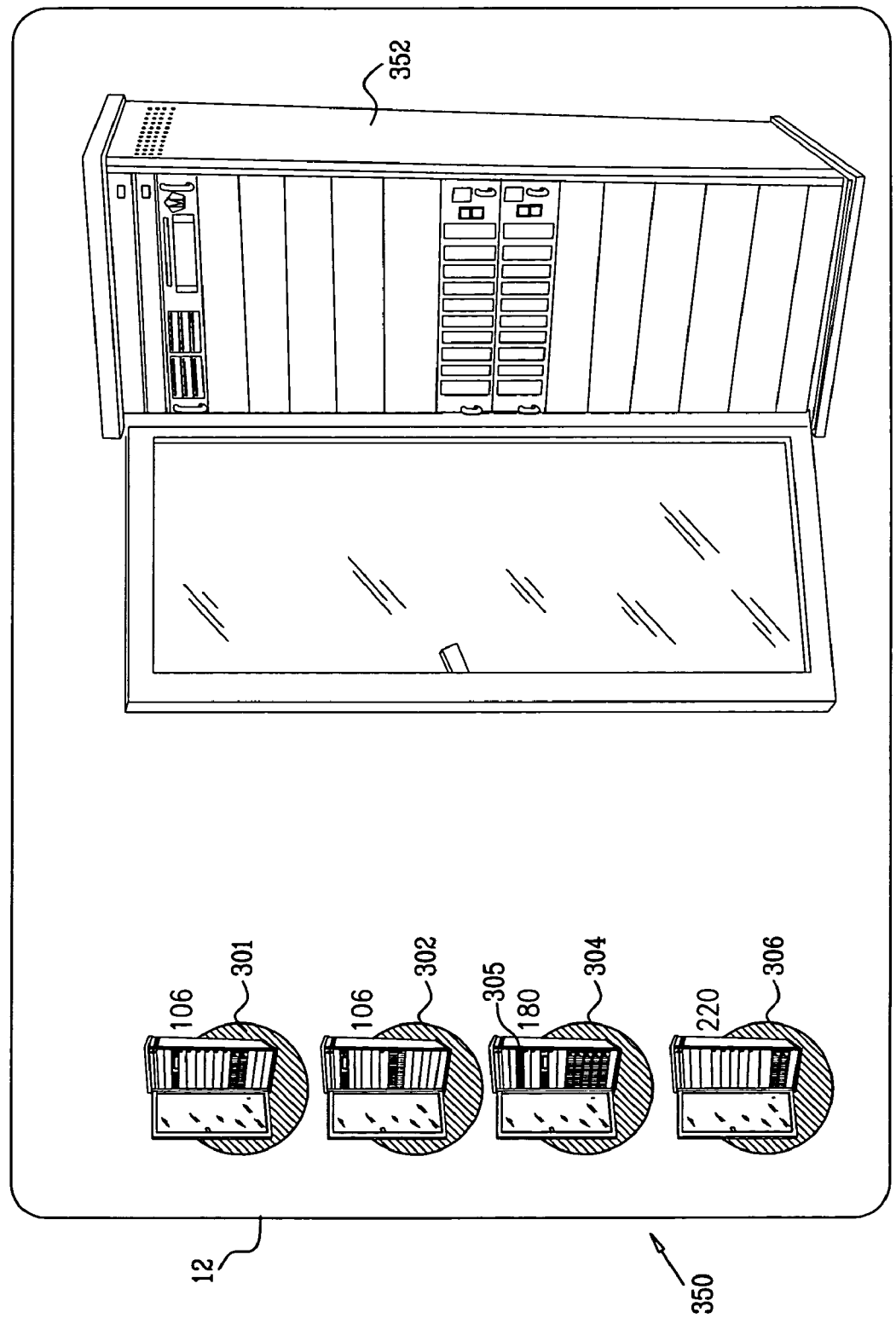

GRAPHIC USER INTERFACE FOR A STORAGE SYSTEM

RELATED APPLICATION

This application is a continuation-in-part to application Ser. No. 11/090,444 titled "Graphic User Interface for a Storage System" filed Mar. 24, 2005 now U.S. Pat. No. 7,293,116, which is incorporated herein by reference.

FIELD OF THE INVENTION

The present invention relates generally to data storage systems, and specifically to a graphic user interface for facilitating operation of the system.

BACKGROUND OF THE INVENTION

As demands placed upon data storage systems increase and as the volume of data processed by the systems also increases, operation of the storage systems becomes more problematic. One of the aspects of operation of storage systems is the interface between an operator of the system and the system itself, and attempts to improve the overall operation by relating to a graphic user interface (GUI) have been made in the prior art. Some of these GUIs use text describing elements of the storage system, and/or icons depicting the elements, to help the operator operate the system.

U.S. Pat. No. 6,845,395 to Blumenau et al., whose disclosure is incorporated herein by reference, describes a user interface that allows communication with a database. A graphic user interface graphically represents elements of the storage system, and permits a user to view a topology of the system at user-selectable levels of detail.

U.S. Pat. No. 6,845,344 to Lally et al., whose disclosure is incorporated herein by reference, describes a graphic user interface that enables time delays and different configurations to be applied to elements of a storage system.

U.S. Pat. No. 6,839,747 to Blumenau et al., whose disclosure is incorporated herein by reference, describes a graphic user interface that permits a user of a storage system to allow or deny access to elements of the system by manipulating graphical representations of the elements.

U.S. Pat. No. 6,751,758 to Alipui et al., whose disclosure is incorporated herein by reference, describes a graphic user interface that is claimed to provide clarity and simplicity in screening errors in a data storage system, and in responding to the errors.

SUMMARY OF THE INVENTION

In embodiments of the present invention, a graphic user interface (GUI) is used to operate a storage system which may comprise one or more storage sub-systems. Each sub-system comprises elements which have a visible relationship with each other. The elements of each of the sub-systems are coupled to a system control unit which includes a display. For each sub-system, the GUI generates a visually realistic image of the elements of the sub-system. The image is drawn on the display, and has the same visible relationship as the actual elements; in addition, a property change of one or more of the elements may be displayed by altering the appearance of the element.

In response to one or more inputs from a user of the storage system, the appearance of the image or images may be further modified, the modification enabling the user to determine characteristics of the storage system in a more efficient and intuitive manner. In addition, the user may interact with the image to make physical alterations to the storage sub-systems.

In one embodiment of the present invention, a first input from the user generates an enlarged image of one of the elements. The enlarged image provides positive feedback to the user that the element has been selected. A second input enables the user to check and manipulate characteristics of the element.

In an alternative embodiment comprising a plurality of sub-systems, each sub-system is displayed as a reduced size realistic image. The user input generates one of the images as a larger image. The user may use further inputs, as described above, to interact with the enlarged image.

In a further alternative embodiment, the user input forms an at least partially transparent overlay on the realistic image of a sub-system. The user may apply further inputs to display characteristics of elements of the sub-system on the overlay, while maintaining the visibility of the underlying images of the elements.

In a disclosed embodiment, the user input generates an image of another side of the sub-system that is not initially shown on the display. For example, the initial image may be of a front side of the sub-system, and the user input may cause a part or all of the rear side to be displayed. The user may apply further inputs to check and/or manipulate characteristics of the sub-system using the image of the other side.

There is therefore provided, according to an embodiment of the present invention, a method for interfacing with a storage system having a plurality of elements, the elements having a visible relationship with each other, and being coupled to a system control unit including a display, the method including:

drawing an image of the elements on the display, the image showing the visible relationship;

modifying an appearance of one of the elements in the image to represent a property of the element;

in response to a first input from a user of the storage system to the system control unit, drawing an enlarged image of the element and representing the property in the enlarged image; and in response to a second input from a user of the storage system to the system control unit with respect to the enlarged image, representing a further property of the element in the enlarged image.

Typically, the image is a realistic image of the storage system, and wherein the enlarged image is a realistic image of the one element. Optionally, representing the property includes displaying text describing the property on the display.

There is further provided, according to an embodiment of the present invention, a method for interfacing with a storage system having a first plurality of sub-systems, each of the sub-systems having respective second pluralities of elements having respective visible relationships with each other, each of the sub-systems being coupled to a system control unit including a display, the method including:

drawing an image of each of the sub-systems on the display, each such image having the respective second plurality of elements and showing the respective visible relationships;

in response to a first input from a user of the storage system, selecting the image of a given one of the sub-systems, so as to form a selected image;

enlarging the selected image to form an enlarged image of the given sub-system;

modifying an appearance of one of the elements in the enlarged image to represent a property of the element; and in response to a second input from the user to the system control unit, making a change in the property of the element and representing the change in the appearance of the element.

Typically, the image of each of the sub-systems is a realistic image.

There is also provided, according to an embodiment of the present invention, a method for interfacing with a storage system having a plurality of elements, the elements having a visible relationship with each other, and being coupled to a system control unit including a display, the method including:

drawing an image of the elements on the display, the image showing the visible relationship;

modifying an appearance of one of the elements in the image to represent a first property of the element; and in response to an input from the user, drawing an at least partly transparent overlay on the image of the elements and drawing on the overlay a representation of a second property of the element.

In one embodiment, the representation includes a graphical plot of the property.

Optionally, the method also includes drawing on the overlay the representation of a third property of a second of the elements.

There is yet further provided, according to an embodiment of the present invention, a method for interfacing with a storage system having a plurality of elements and a first side having a first visible relationship of the elements with each other and a second side having a second visible relationship of the elements with each other, the storage system being coupled to a system control unit including a display, the method including:

drawing a first image of the first side on the display, the first image showing the first visible relationship of the elements;

modifying a first appearance of a given one of the elements in the first image to represent a first property of the element;

in response to an input from a user of the storage system to the system control unit, drawing a second image of the second side on the display, the second image showing the second visible relationship of the elements; and modifying a second appearance of the given element in the second image to represent a second property of the element.

Typically, the second side of the storage system is invisible to the user at a time when the first side is visible to the user.

There is further provided, according to an embodiment of the present invention, apparatus for interfacing with a storage system having a plurality of elements, the elements having a visible relationship with each other, and being coupled to a system control unit including a display, the apparatus including:

a processor, which is adapted to:

draw an image of the elements on the display, the image showing the visible relationship, modify an appearance of one of the elements in the image to represent a property of the element, in response to a first input from a user of the storage system to the system control unit, draw an enlarged image of the element and represent the property in the enlarged image, and in response to a second input from a user of the storage system to the system control unit with respect to the enlarged image, represent a further property of the element in the enlarged image.

There is yet further provided, according to an embodiment of the present invention, apparatus for interfacing with a storage system having a plurality of elements, the elements having a visible relationship with each other, and being coupled to a system control unit including a display, the apparatus including:

a processor which is adapted to:

draw an image of the elements on the display, the image showing the visible relationship, modify an appearance of one of the elements in the image to represent a first property of the element, and in response to an input from the user, draw an at least partly transparent overlay on the image of the elements and draw on the overlay a representation of a second property of the element.

The present invention will be more fully understood from the following detailed description of the embodiments thereof, taken together with the drawings in which:

BRIEF DESCRIPTION OF THE DRAWINGS

FIG. 1 is a schematic illustration of a graphic user interface (GUI) for a data storage system, according to an embodiment of the present invention;

FIG. 2 illustrates a console in the system of FIG. 1, and an image of the console, according to an embodiment of the present invention;

FIGS. 3A-3L show examples of use of the GUI of FIG. 1, according to embodiments of the present invention; and FIGS. 4A-4F show further examples of the use of the GUI of FIG. 1, according to embodiments of the present invention.

DETAILED DESCRIPTION OF EMBODIMENTS

Figure 3A:
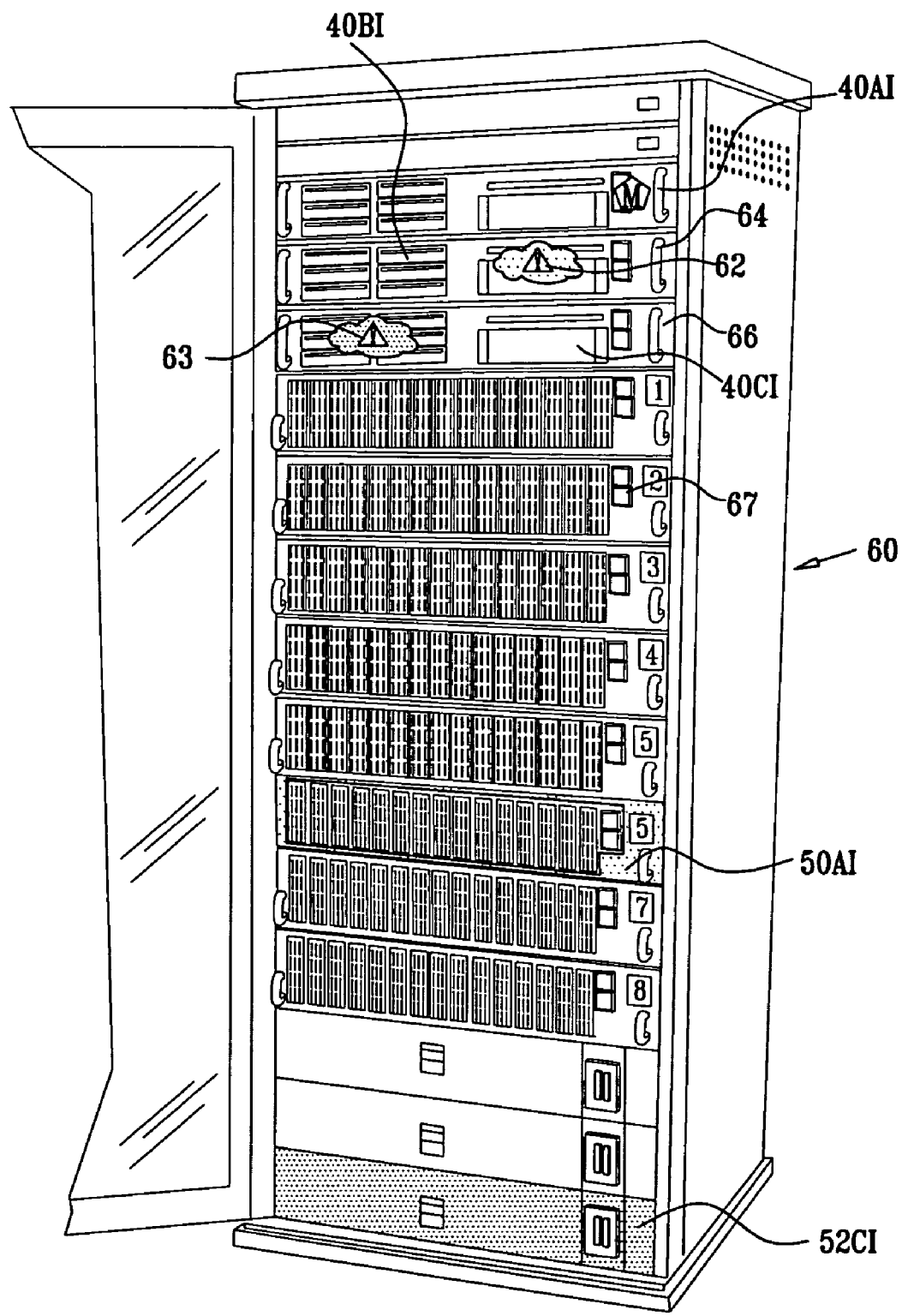

Reference is now made to FIG. 1, which is a schematic illustration of a graphic user interface (GUI) 10 for a data storage system 20, according to an embodiment of the present invention. System 20 acts as a facility for one or more hosts 24 to read data from, write data to, and store data. System 20 is assumed to comprise one or more physically separate sub-systems 22, and the elements of each sub-system are typically positioned in one respective location and are typically coupled together using cables and/or other physical couplings.

Storage system 20 is controlled by a system operator 28 via a system control unit 11, typically comprising an off-the-shelf personal computer. Hosts 24, sub-systems 22, and unit 11 may be coupled using any suitable communication method known in the art, including wireless, wired, and/or optical communication methods, and are assumed herein to be coupled by and operate in a network 13.

Control unit 11 comprises a processing unit 16 coupled to a memory 18 in a processor 15, and the processor operates a display 12. By way of example, the system operator is assumed to operate control unit 11 using a keyboard 14 and/or a pointing device 26, which provide operator inputs to the control unit. It will be understood, however, that operation of the present invention is not limited to a particular method for inputting to system control unit 11, that any other suitable system for providing such operator inputs may be used, and that all such systems are considered to be comprised within the scope of the present invention. As is described in more detail below, system operator 28 generates an interactive realistic non-iconic image of each physical sub-system 22 and its elements on display 12, using display software 32 stored in memory 18. Display software 32 generates the images to be substantially similar in texture and color gradations to images produced by photographing the sub-system. Typically the images of sub-system 22 and its elements are three-dimensional (3D) images. It will be appreciated that each sub-system 22 typically comprises different elements, and that each of the sub-systems are typically arranged physically differently. By way of example, the description hereinbelow assumes that one of sub-systems 22 comprises a console 34 housing elements of the sub-system, and that display software 32 generates a 3D image 30 of console 34.

FIG. 2 illustrates console 34 and image 30 of the console, according to an embodiment of the present invention. At installation of console 34, elements of the sub-system are positioned in racks 48, typically industry-standard racks, for example 19" racks, of the console. Each rack 48 typically comprises a back-plane, mid-plane, or other connecting system known in the art such as cables, which mate with the element inserted into the rack, and via which the element is able to transmit and receive data.

The elements installed in console 34 comprise three computers 40. By way of example, each computer 40 is herein assumed to comprise an interface module 43, which acts as an interface between storage system 20 and hosts 24, and a management module 45, which manages operations of the storage sub-system. Each computer 40 typically includes a processing unit (PU) 42 and a memory 44, the memory typically being used as a cache for its PU and/or its interface module, as well as for storing software used by its computer in operating sub-system 22.

Elements of console 34 also comprise computing units 46 which act as non-volatile data storage units, and which are herein by way of example assumed to be arranged in respective banks 50 of racks 48, and which are used to store data used by the system. Computing units 46 are also referred to herein as non-volatile data storage units 46. Each non-volatile data storage unit typically comprises one or more magnetic disks, for example, fifteen disks, operating together with a cache for the disks. It will be appreciated that other forms of non-volatile data storage unit, such as compact disks, magnetic tapes or media, optical media, and/or other media wherein data may be stored permanently, may be included in one or more of banks 50, and that all such modes of non-volatile storage are assumed to be comprised within the present invention.

Elements installed in console 34 further comprise power supplies 52, typically uninterruptible power supplies, in respective racks 48. Typically, elements corresponding to computers 40, storage units 46, and power supplies 52 are installed in other sub-systems 22, in a generally similar configuration to that of the elements installed in console 34. In an embodiment of the present invention, the elements of storage system 20 are configured to operate with redundancy, so that storage system 20 may continue to function on failure of a processor, a storage unit, or a power supply of any specific sub-system 22. The redundancy may be implemented to operate at a local sub-system level, i.e., within the sub-system, and/or at a system level, i.e., between sub-systems.

In the following description, unless otherwise stated, console 34 is assumed to comprise three computers 40, 120 storage units 46 arranged in eight banks, each bank 50 having fifteen units, and three power supplies 52 which are uninterruptible. To distinguish between similar elements, a letter suffix is added to the identifying numeral. For example, the three computers of console 34 may be identified as computer 40A, 40B, and 40C.

Image 30 is generated so as to be substantially indistinguishable from an image produced by photographing console 34, so that the image presented on display 12 appears to operator 28 as a realistic reproduction of console 34, and not as an iconic reproduction. Image 30 is typically a three-dimensional image, and the realism of the image is typically further enhanced using methods well known in the graphic arts, such as varying color dimensions and/or a perspective of the image or a part of the image. Such methods are also applied so that changes/modifications in image 30, in response to an input from operator 28 as described in more detail below, also appear to the operator as realistic changes/modifications. Image 30 is produced by any image-producing method known in the art. In one embodiment of the present invention, image 30 is produced using a film or a digital camera, by taking a photograph of the console. It will be understood that image 30, as represented herein, is a schematic simplified representation of the realistic image presented on display 12.

Display software 32 typically generates image 30 from a skeleton image of an empty console, which the software populates with images of the elements which have been installed in console 34. The images of the elements are also generated by software 32.

While the description herein, except where otherwise stated, relates to a sub-system 22 in the form of console 34, it will be appreciated that other sub-systems 22 may be in the form of more than one console, and/or may be assembled in other physical arrangements. In these cases, an image of a skeleton of the respective physical arrangement is formed by the display software 32 of the sub-system. The skeleton image may be produced as a computer-generated image using one or more photographs of the sub-system, and/or by an operator such as operator 28 using a computer graphics program, by methods which are known in the art. The skeleton image is populated, as is described herein for console 34, with images of the elements installed in the respective sub-system.

The elements in console 34 have a visual relationship with respect to each other that is apparent to an observer of the console, and software 32 generates the images of the elements to have the same visual relationship as that of the elements themselves. Hereinbelow, as necessary, images of an element are differentiated from the element itself by adding a suffix letter I to the identifying numeral of the element. Thus, images of computers 40A, 40B, and 40C are labeled 40AI, 40BI, 40CI.

Each of the elements installed in console 34 comprises identifying hardware and/or software, which operates so that when any specific element has been installed in the console, control unit 11 is able to identify a type and a position of the element. Control unit 11 is also able to detect the absence of any elements in a particular position within console 34. In addition to having identifying hardware and/or software, each type of element comprises information collecting hardware and/or software, which enables each specific element to gather information regarding the element, and to transmit this information to unit 11. The type of information collected and transmitted is a function of the element. In the specification and in the claims, information concerning a particular aspect of an element that may be collected by control unit 11 is termed a property of the element. Such aspects include, but are not limited to, the type, status, and the position of the element, as well as operating parameters of the element. Certain properties such as the position of the element, and some of the operating parameters thereof, may be changed. Such changes include copying of data to the element, reading data from the element, erasure of data from the element, partitioning of the element, and reconfiguration of data within the element. Those skilled in the art will be able to formulate other possible changes in operating parameters of specific elements, and all such changes are assumed to be within the scope of the present invention. Some aspects of elements are described in more detail hereinbelow.

For a power supply such as uninterruptible power supply 52, the power supply typically transmits whether the power supply is supplying power to console 34 in the absence of line power. If line power is not present, the power supply transmits the values of the voltages and currents it is supplying and the remaining time it is able to safely continue supplying these voltages and currents. If line power is present, the power supply transmits this fact to unit 11, together with other relevant information such as how the power supply is able to react in the case of a line power failure.

Each non-volatile data storage unit 46 typically transmits a total capacity of the unit, together with how much of the capacity is being used. Each storage unit may also transmit a number of primary and secondary slices that the unit has been partitioned into, primary slices being used to store a first copy of data, and secondary slices being used to store a backup data copy. Other information that a storage unit transmits typically includes a status of the unit, e.g., whether the unit is in service and available, is booting, has an "OK" or a "failed" status, and/or an average throughput over a predetermined period of time, an average latency over the predetermined period of time, whether the unit is in a process of rebuilding its data, to which cache unit the storage unit is coupled, and properties of the cache unit.

In an embodiment of the present invention, each storage unit transmits data reflecting the activity of the unit, for example, the number of read and/or write requests handled by the unit in a given time, and/or the size of data read from or written to the unit in the given time. Each computer 40 typically transmits data concerning software and hardware it is configured to run, such as the operation or non-operation of each of its management and interface modules such as a capacity of the modules, a fraction of the capacity that is being used, and/or an availability of the module in the case of it being configured to fulfill a redundancy requirement.

Each computer 40 may also transmit information on specific programs designed to run on the computer, and the status of the programs, i.e., if the programs are executing correctly or if there is some problem with the execution. Also transmitted may be data concerning the PU of the computer, such as the activity of the PU, and of the memory coupled to the PU, such as, in the case of the memory being used as a cache, relevant data concerning the cache use. Typically, such data includes a fraction of "hits" which are successful in a given time period, i.e., wherein the data requested is already present in the cache. Typically, one of computers 40 acts as an operational manager, in which case the other computers 40 are configured as one or more redundant managers.

The data transmitted from the individual elements of console 34 is used by control unit 11 to generate graphic information about specific elements of system 20, combinations of specific elements, and about the overall system. The graphic information is overlaid on image 30. For combinations of specific elements, and for the overall system, the graphic information is typically generated by control unit 11 analyzing a variety of received data from the elements of system 20 to derive parameters for the required combination and/or the overall system. The graphic information may be presented automatically on GUI 10 without any input from operator 28, or may be accessed by the operator providing an input to processing unit 16, typically using a pointing device such as device 26.

In addition to transmitting information data to control unit 11, each of the elements of console 34 is typically configured to receive management and control signals from the control unit for operating the element. Such management and control signals include signals that activate, deactivate, update, and/or reconfigure an element, and are typically provided by operator 28 providing an input to GUI 10 on display 12. GUI 10 thus acts as a fully interactive monitoring and control interface. In addition, because the GUI is substantially visually identical to physical console 34, the ease of use of the interface is enhanced.

The input provided by operator 28 is typically initiated by the operator using pointing device 26 to select a particular element. The selection may be by moving the cursor of device 26 over the element, and/or by clicking on the element, the latter being understood to comprise all pointing device methods known in the art, including single, double, and treble clicking, and/or use of left, right, or intermediate pointing device controls. The different forms of selection typically generate different responses on display 12, such as generating a menu having one or more properties of the selected element that may be chosen for more detailed display by operator 28. The responses are pre-programmed into display software 32 by a system operator such as operator 28.

An embodiment of the present invention uses device 26 to implement the concept of "drag-and-drop," the concept being applied herein by display software 32 to the images of selected elements. Functions that may be performed by drag-and-drop include, but are not limited to, copying the contents of one storage unit 46 to another storage unit 46, moving the contents from one storage unit 46 to another storage unit 46, and rebuilding or reconfiguring the contents of a storage unit 46. Other functions that may be performed using device 26 on image 30 will be apparent to those skilled in the art, and all such functions are assumed to be included within the scope of the present invention.

FIGS. 3A-3L below show examples of information received from elements and combinations of elements of console 34, as well as operations that may be performed on the elements, the information and the operations being considered to be properties of their respective element or combination of elements, and being transmitted via GUI 10, according to embodiments of the present invention. It will be appreciated that FIGS. 3A-3L are schematic illustrations of changes/modifications that are overlaid on realistic image 30, and that the overlaid changes/modifications do not significantly reduce the realism of the underlying image.

In a diagram 60 in FIG. 3A, computers 40A, 40B, and 40C have transmitted information to control unit 11. In image 40AI the image "M" indicates that the management module of computer 40A is operational. Images 40BI and 40CI indicate that each respective computer has detected a problem in one of the modules it is running. GUI 10 presents each problem using specific problem-detected symbols 62 and 63. Symbol 62 indicates a problem has been detected in the management module of computer 40B; symbol 63 indicates that a problem has been detected in the interface module of computer 40C. Typically, a level of severity of the problem may be indicated by applying different colors to each problem-detected symbol, and/or by providing another type of visual indication such as configuring the symbol to blink and/or change form. Optionally, a name of a program having the problem, and/or other information relating to the problem, is displayed together with the symbol. Operator 28 may determine further information on the problem detected by using device 26 to interrogate a specific computer, for example by pointing to the symbol 62 displayed on image 40BI. The operator may also activate or deactivate the computers by pointing/clicking on images 64 or 66 of power switches of computer images 40BI and 40CI, and may also activate other elements such as banks 50 or power supplies 52 by pointing/clicking on images of their power switches, exemplified by an image 67 of a switch for one of banks 50.

Image 50AI is shaded, to represent that on display 12 the image of bank 50A is colored. Typically, the color represents a state of bank 50A. For example, image 50AI may be colored red, while maintaining the underlying realism of the image of bank 50A, to represent that the bank has failed.

GUI 10 also indicates that power supply 52C has informed unit 11 that it is being phased out of operation in console 34 by altering a color of the image 52CI, the color change being represented by shading in FIG. 3A. The operator 28 may determine further information on the problem by using device 26 to interrogate the power supply, for example by pointing to/clicking on image 52CI.

Figure 3B:
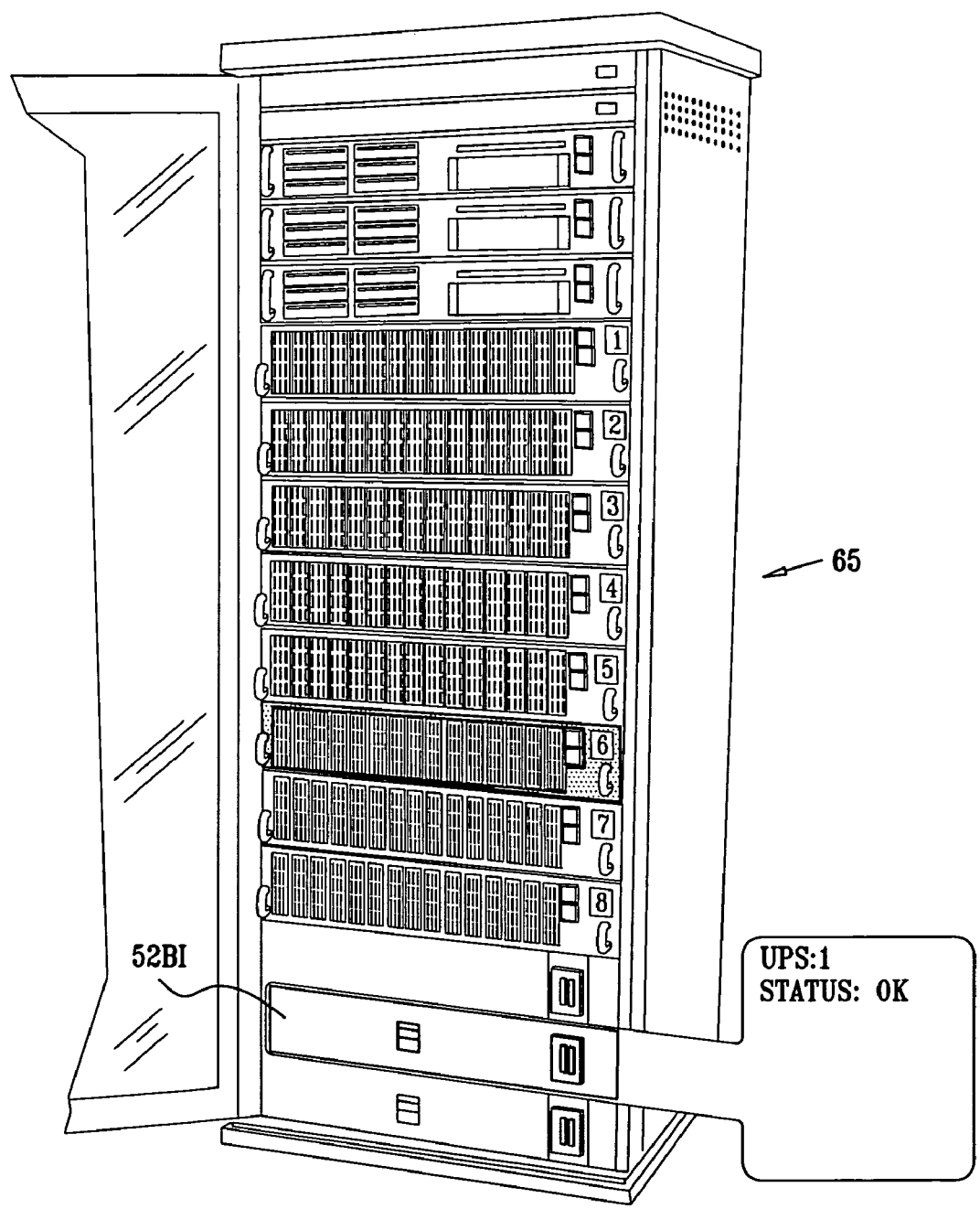

In FIG. 3B a diagram 65 shows that, on interrogating power supply 52B by pointing to/clicking on image 52BI, GUI 10 displays a message indicating the status of the power supply.

Figure 3C:
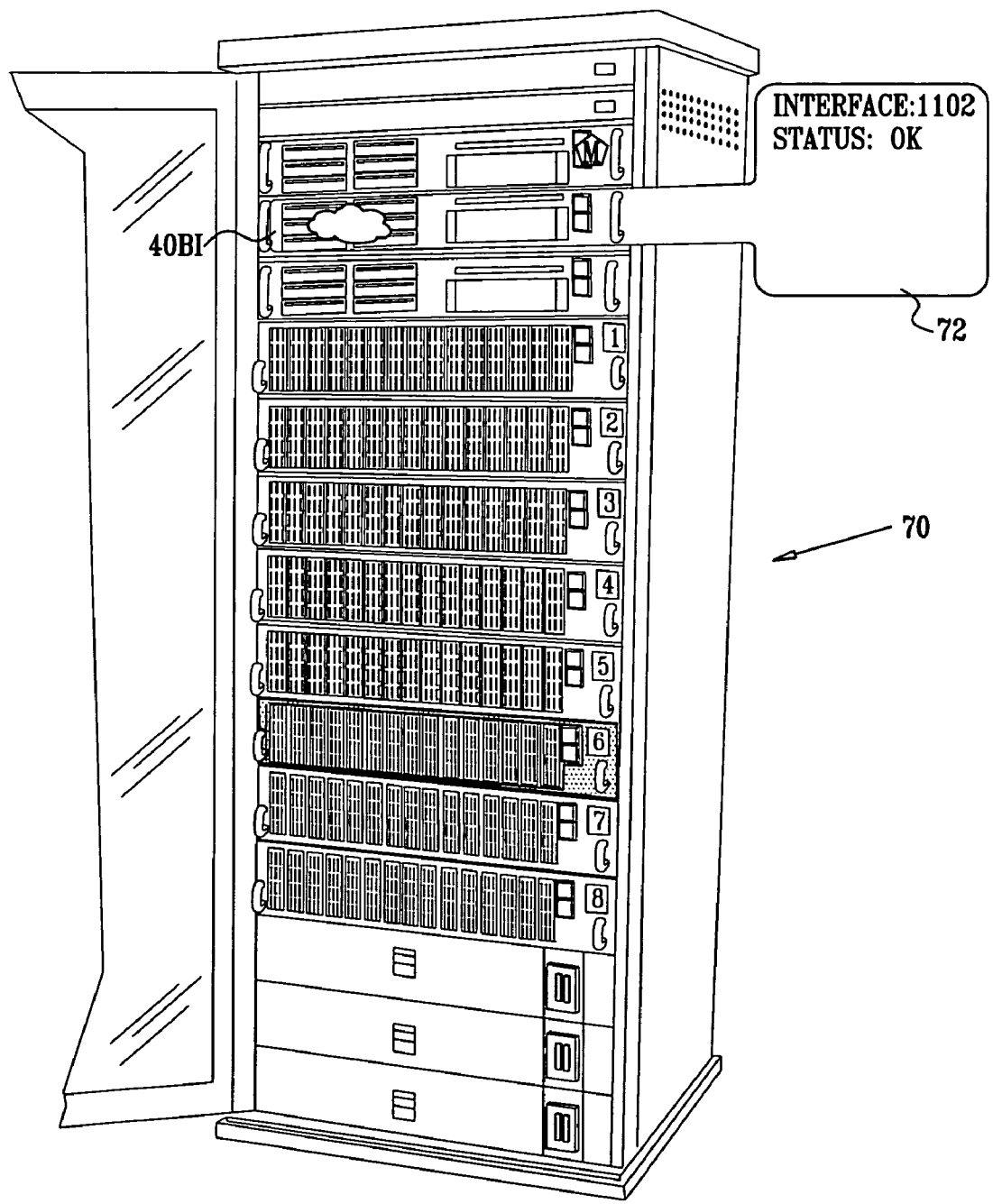
Figure 3D:
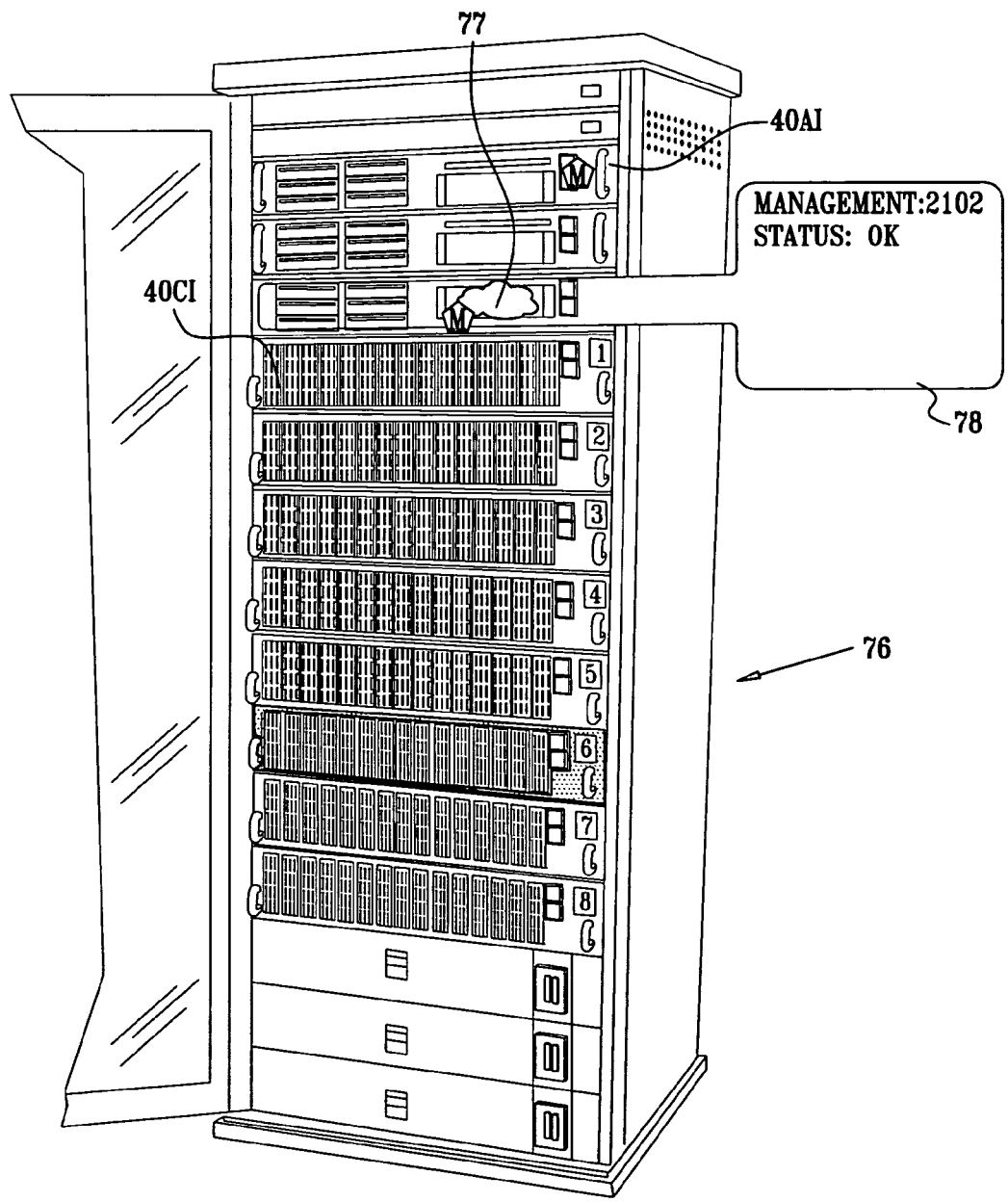

In a diagram 70 in FIG. 3C, at a time that computer 40B appears to be functioning correctly, operator 28 interrogates the computer to determine the status of the interface module the computer is operating, using device 26 to select image 40BI. In response GUI 10 displays a message 72 that the module is operating correctly. In a diagram 76 in FIG. 3D, the "M" of image 40AI indicates that the management module of computer 40A is operational. Operator 28 interrogates computer 40C to determine the status of its management module using image 40CI, and in response GUI 10 displays a management program symbol 77 indicating that the management module of computer 40C is available, as well as a message 78 that the status of the management module is OK.

Figure 3E:
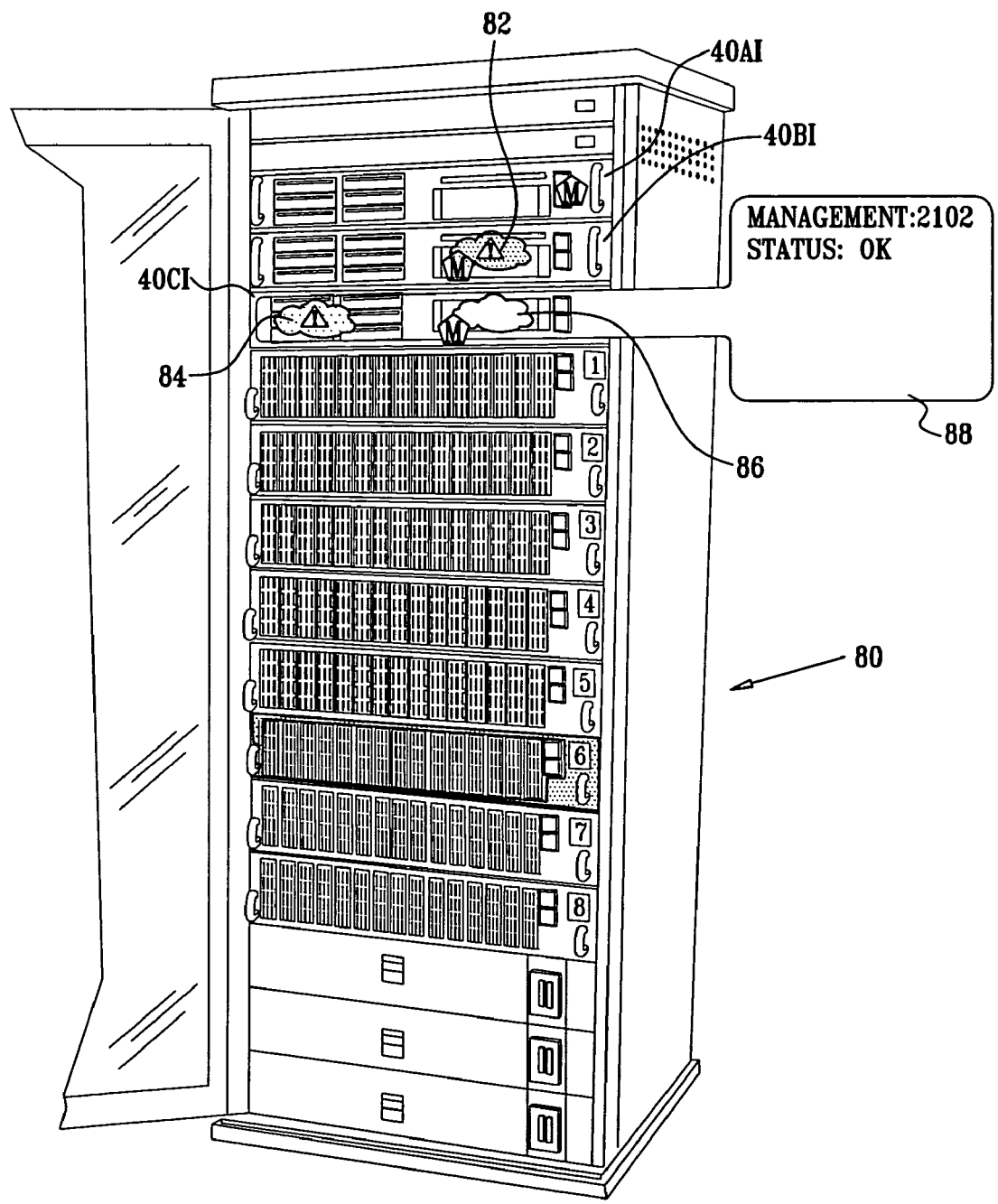

In a diagram 80 in FIG. 3E, GUI 10 shows that computer 40B has detected a problem in its management module, GUI 10 indicating the problem by overlaying a problem-indicating symbol 82 on the appropriate part of image 40BI. Computer 40C has detected a problem in the interface module it is running, GUI 10 overlaying problem-indicating image 84 on the appropriate part of image 40CI. The "M" of image 40AI indicates that the management module of computer 40A is operational. The problem-indicating symbols are typically colored with different colors to indicate a level of severity of the detected problem. At the time that the problems are indicated, operator 28 selects image 40CI to interrogate computer 40C concerning its management module, and GUI 10 illustrates with a program symbol 86 and a message 88 that the status of the management module is OK.

Figure 3F:
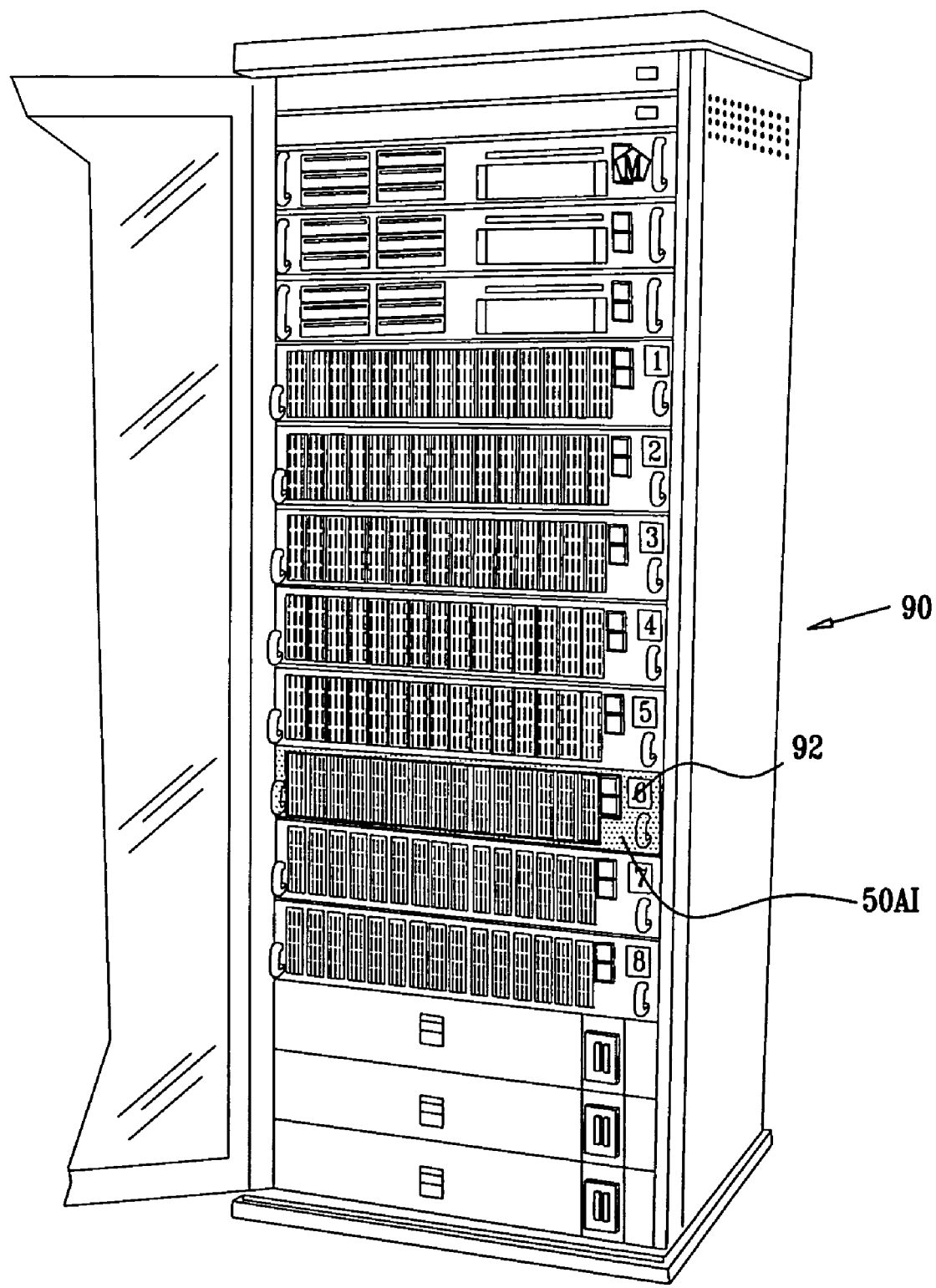

FIG. 3F illustrates information received from disks 46. In a diagram 90, GUI 10 shows that a bank 50A of disks that have failed are rebooting by surrounding a colored image 50AI with a different colored border 92, The different colors are shown in FIG. 3F as different shadings.

Figure 3G:
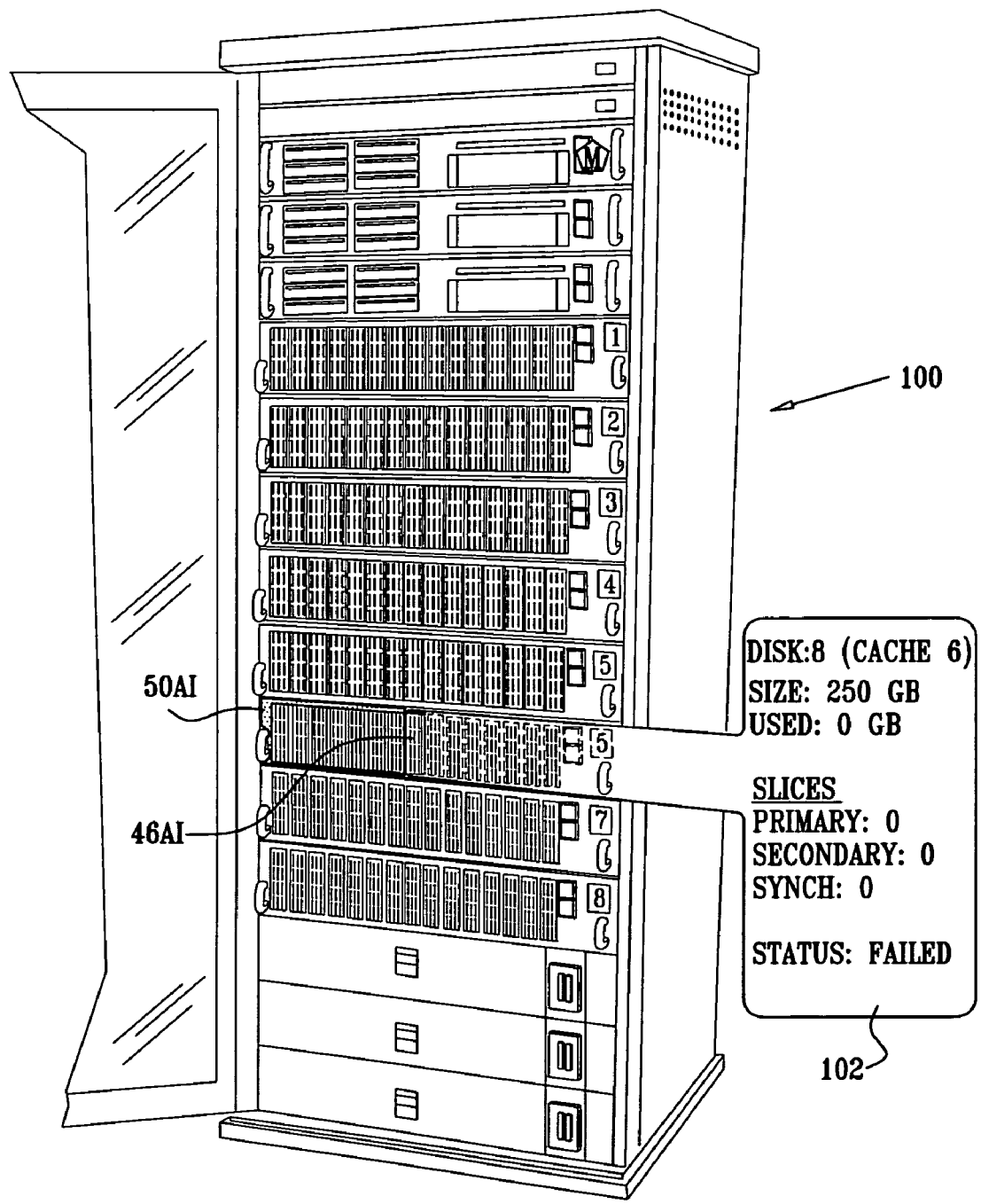

In a diagram 100 in FIG. 3G, GUI 10 indicates that bank 50A has informed unit 11 of a problem by coloring image 50AI. Operator 28 may interrogate each of the units in bank 50A, by pointing to/clicking on its respective image in image 50AI. By way of example, diagram 100 shows that on pointing to image 46AI of storage unit 46A, operator 28 receives a message 102 giving details of the unit and of the problem.

Figure 3H:
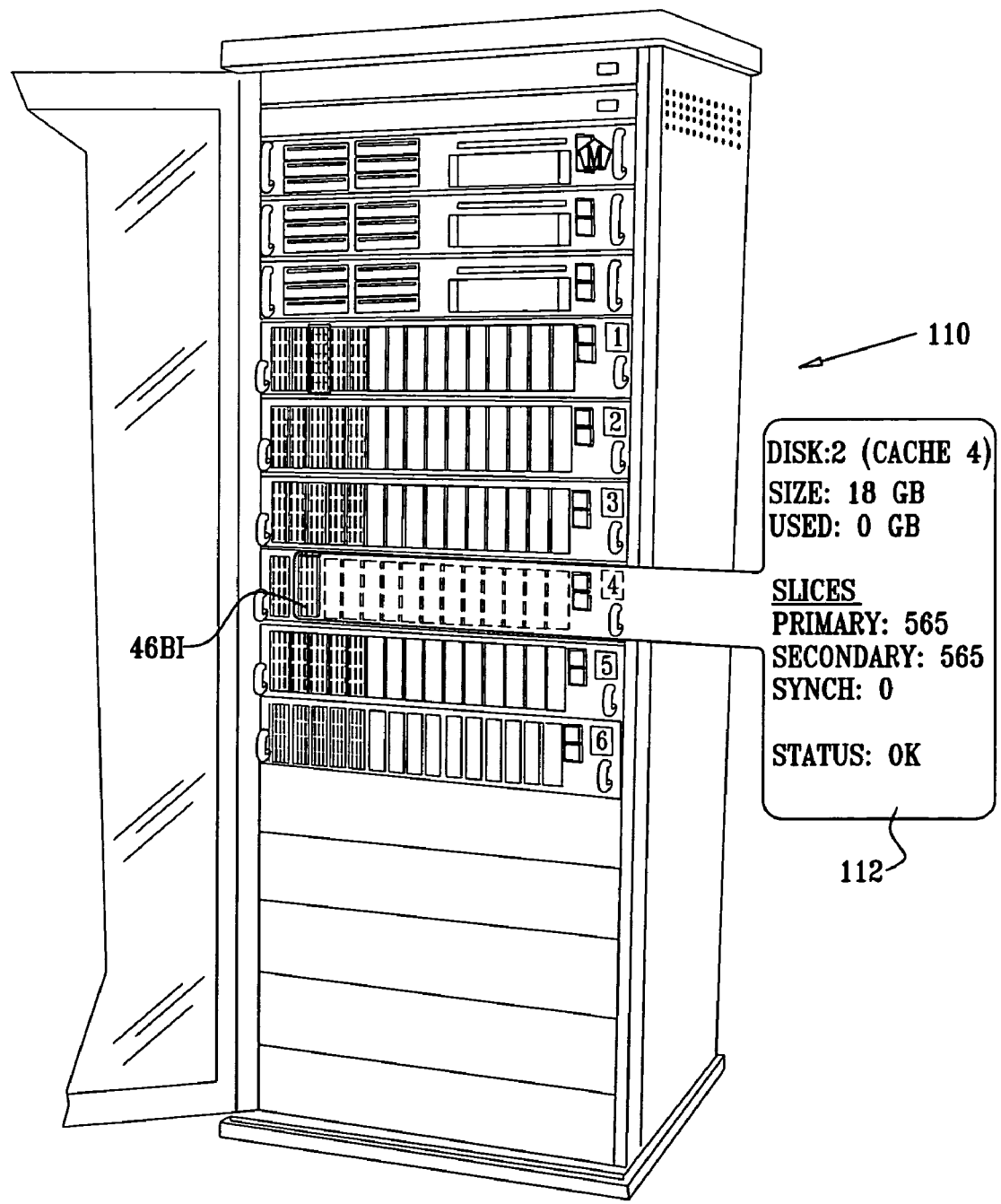
Figure 31:
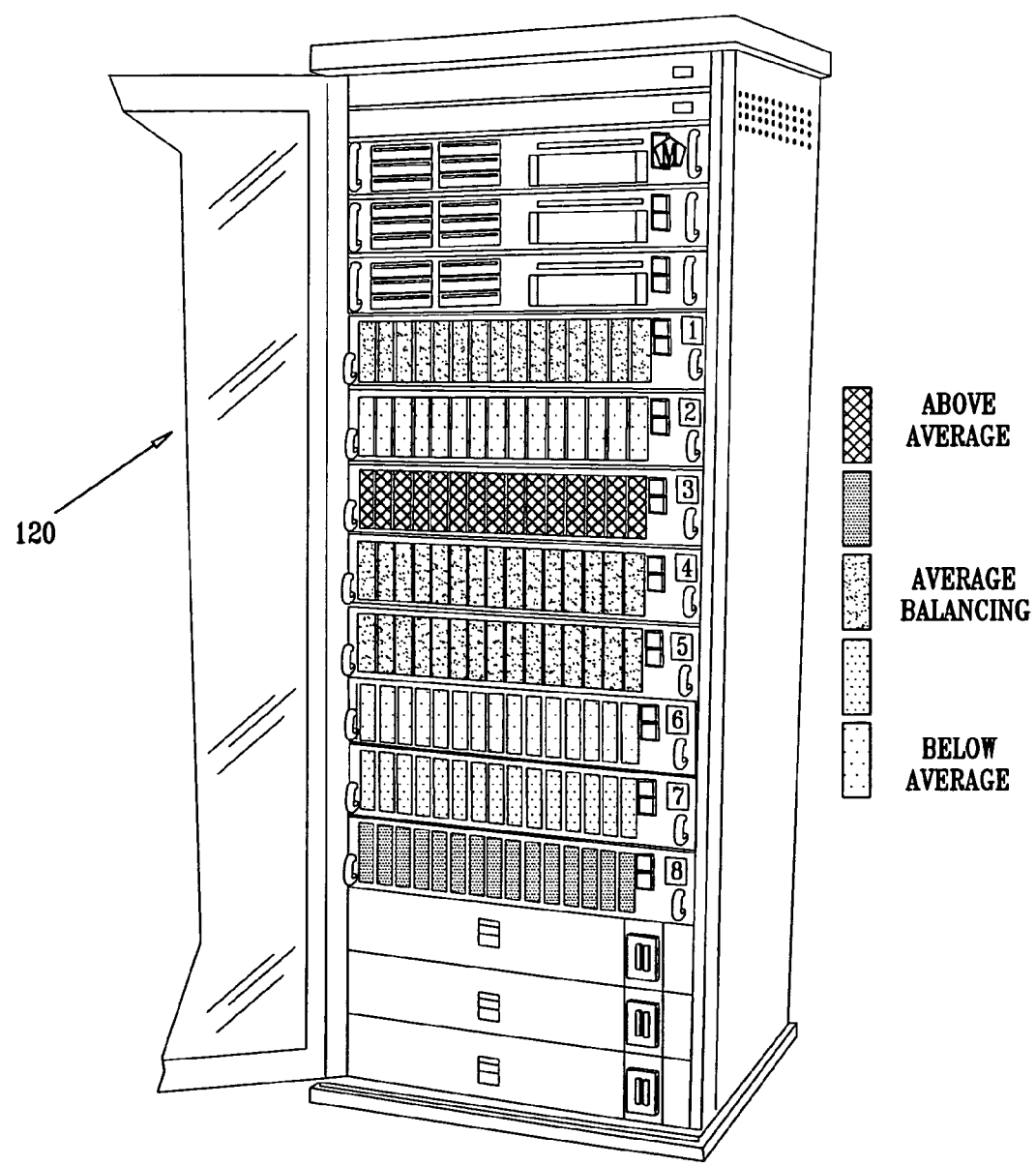

In a diagram 110 in FIG. 3H, GUI 10 shows that console 34 has been reconfigured from the configurations of FIGS. 3A-3G. Console 34 now comprises three computers 40A, 40B, and 40C, and six banks 50 of storage units, each bank consisting of five storage units 46. Typically the reconfiguration is performed by operator 28 using device 26 to close down the other ten storage units in each bank, by clicking on their on/off switches. By way of example, a disk in the fourth bank of disks is illustrated as being interrogated by pointing to its image 46BI, and a message 112 giving details of the disk displays on GUI 10.

Figure 3J:
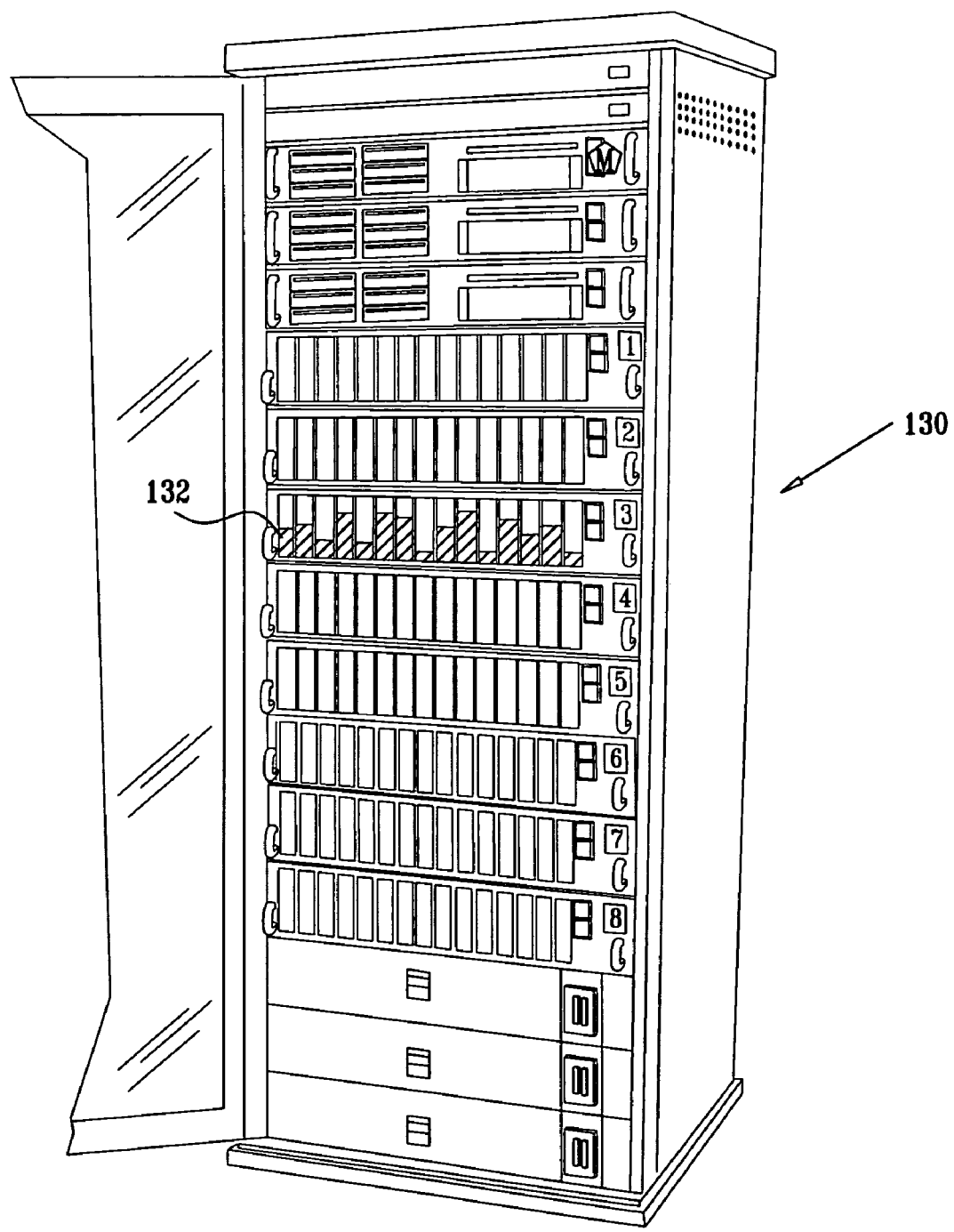

In an embodiment of the present invention, control unit 11 presents metrics of the behavior of the elements comprised in console 34 on image 30, the metrics being presented in a graphical and/or pictorial form and overlaid on the image. FIGS. 3I and 3J illustrate examples of such metrics. The metrics are typically derived by control unit 11 from information transmitted by the elements. For example, control unit 11 may request load data from each of storage units 46, and may derive an average load for console 34. Control unit 11 may then generate a comparison metric of the load on each storage unit, relative to the average, and unit 11 colors each of the images of units 46 according to their metric. Thus, unit 11 generates a visual map of the load balancing of units 46. By way of example, load balancing as measured for each bank 50 of units 46 is illustrated in diagram 120 of FIG. 3I.

Similar visual maps, using visual features or cues other than color known in the art, may be generated to illustrate metrics of specific properties of console 34. Such properties include free capacity and/or activity of the storage units, successful hits on the caches of the units, level of installed redundancy of the units, and other properties that will be apparent to those skilled in the art. In FIG. 3J a diagram 130 illustrates a visual map of the free capacity of each of the storage units 46 in a bank 132 by overlaying and fitting a histogram to the images of the storage units. In an embodiment of the present invention, the image of each storage unit comprises an image of a LED, and flashing of the LED image is used as a cue to indicate activity of the storage unit: the faster the flashing, the higher the rate of activity of the unit.

Figure 3K:
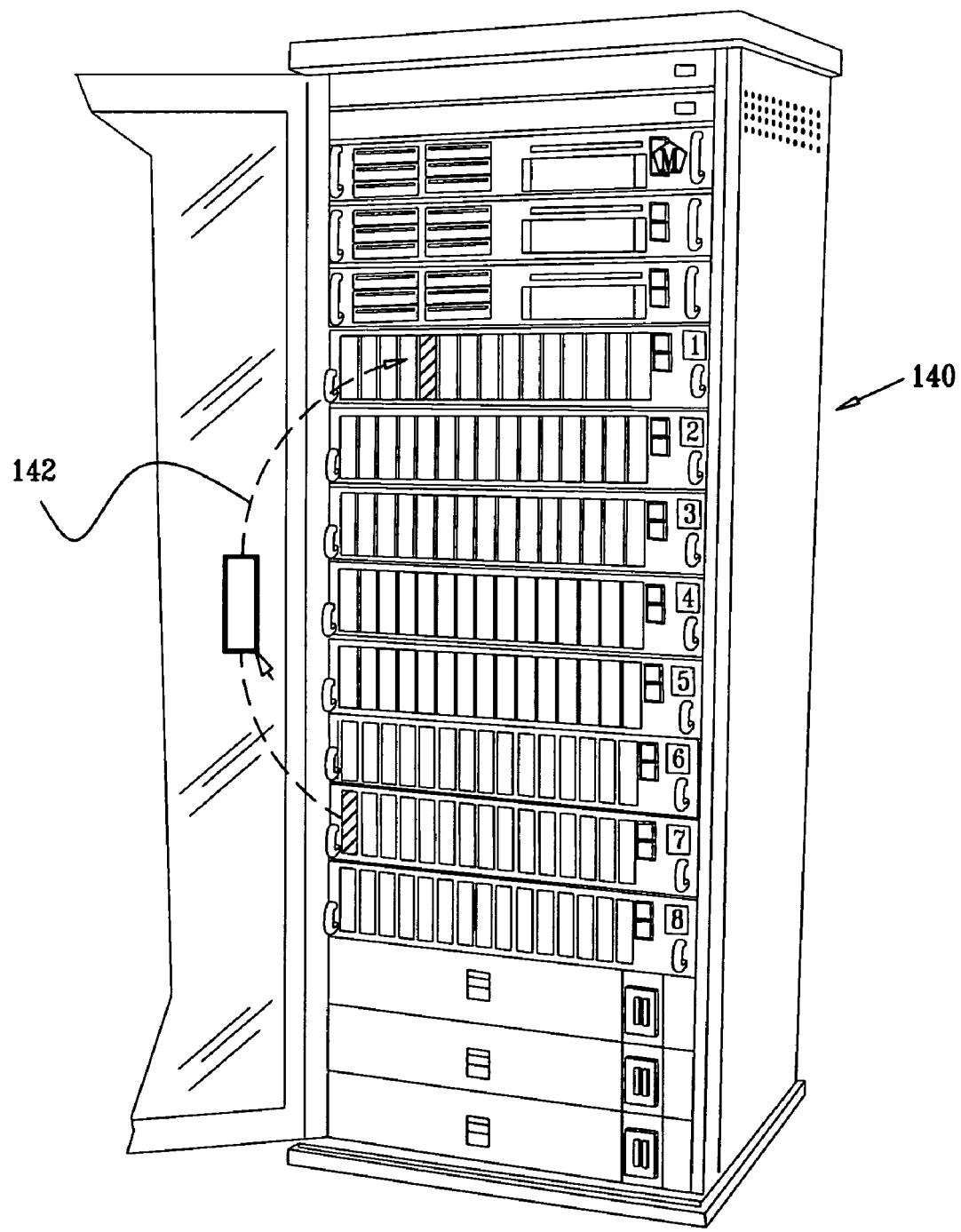

As described above, device 26 may be used to perform drag-and-drop operations between elements of console 34. Such a drag-and-drop operation is illustrated in FIG. 3K, which shows copying of data from a first storage unit 46 to a second storage unit 46, by selecting the first storage unit, and transferring an image of the unit along a path 142 to the second unit.

In FIG. 3L a diagram 150 illustrates how a user of GUI 10 may perform a drag-and-drop operation between elements of different sub-systems 22. The user, such as operator 28, generates image 30 of console 34 on a part 154 of display 12, and an image 152 of another sub-system 22 on another part 156 of the display. The other sub-system 22 and console 34 are typically configured differently. The user may then use the drag-and-drop operation to copy data from a storage unit of console 34 to a storage unit of the other sub-system.

FIGS. 4A-4F show further examples of information received from elements and combinations of elements of console 34, and from other consoles in system 20, the information being considered to be a property of their respective element or combination of elements, and being transmitted via GUI 10, according to embodiments of the present invention. It will be appreciated that FIGS. 4A-4F are schematic illustrations of information that is overlaid on realistic image 30; where the overlaid information comprises images, it will be understood that the realism of the images is of substantially the same quality as realistic image 30. In the following description, references to a console are assumed to be to console 34 unless otherwise stated.

Figure 4A:
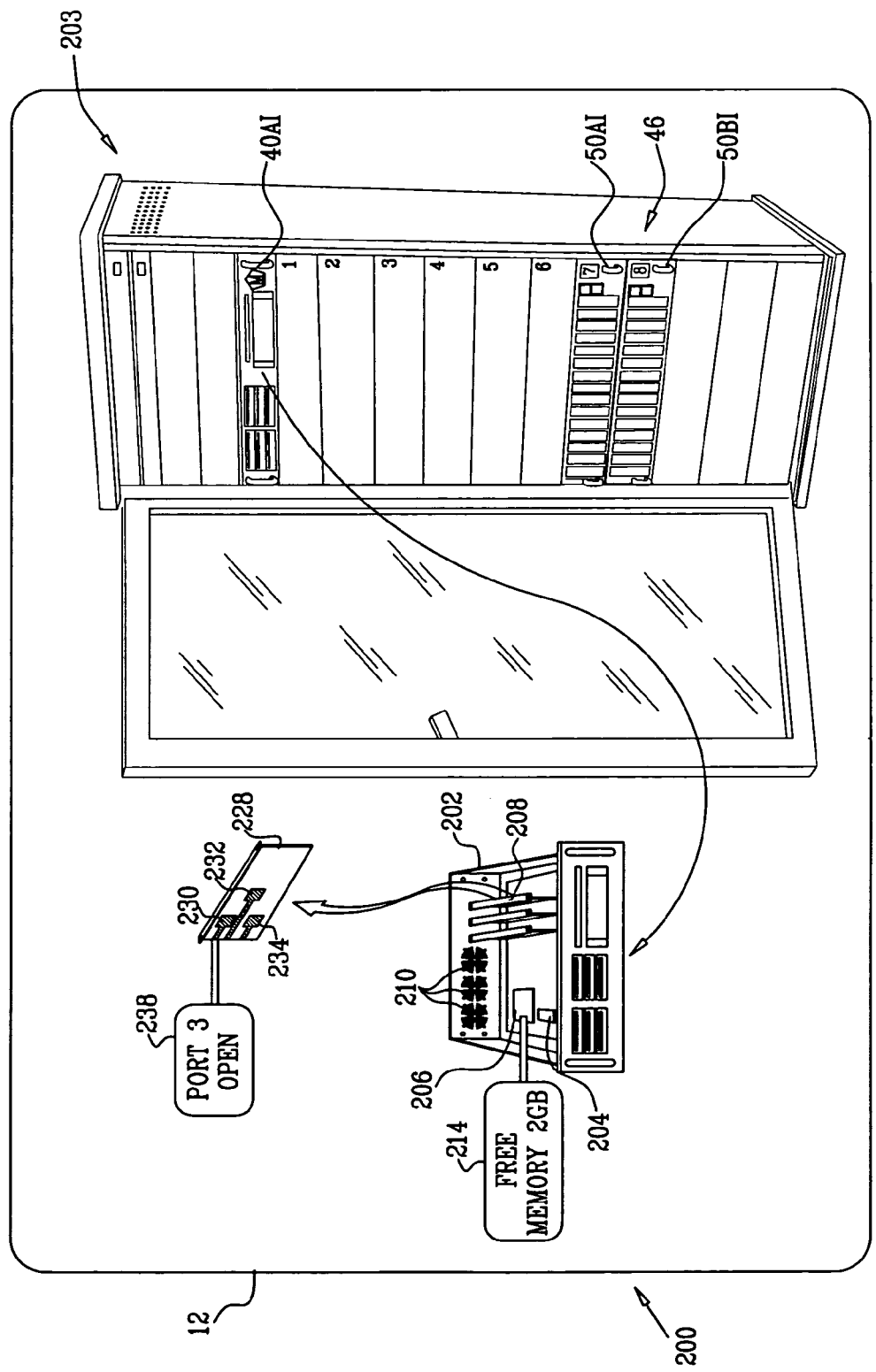

FIG. 4A illustrates operation of GUI 10 in a zoom mode. In a diagram 200, GUI 10 shows that console 34 has been reconfigured from the configurations of FIGS. 3A-3K. Console 34 now comprises one computer 40A, indicated by image 40AI, and two banks 50 of storage units, indicated by images 50AI and 50BI. Each bank 50 comprises fifteen storage units 46. Operator 28 is able to receive information about computer 40A and banks 50, by pointing to the respective images with pointing device 26, the information being presented to the operator, according to the type of component, generally as described above with reference to FIGS. 3A-3J.

In addition, although the components and sub-components of the systems within console 34 are typically densely packed in the console, operator 28 is able to receive more detailed information concerning the operation of the components and/or sub-components in embodiments of the present invention. To implement the more detailed inspection of these elements in the console, GUI 10 is able to operate in a mode, herein termed a visual zoom mode, which generates enlarged images of each component and sub-component, and of their respective internal elements. When operating in the visual zoom mode, operator 28 selects the image of the component, typically using pointing device 26. The selected image appears as an enlarged interactive realistic non-iconic image of the component on display 12. The enlarged image is typically overlaid on image 30 in an at least partially transparent form, so that underlying sections of image 30 remain visible. In an alternative embodiment of the present invention, the enlarged image may be in a non-transparent form on image 30.

By way of example, in diagram 200 an image 202 is assumed to be an enlarged view of computer 40A. To generate image 202, operator 28 in the visual zoom mode selects image 40AI using pointing device 26, generating enlarged realistic image 202 of the computer on display 12. Enlarged image 202 provides positive feedback to operator 28 that computer 40A, as distinct from another part of console 34, has been selected for more detailed inspection. Once image 202 has been generated on display 12, the operator is able to use pointing device 26 and/or keyboard 14 to display characteristics and parameters of the sub-components of computer 40A.

Computer 40A comprises a number of sub-components 203, herein, by way of example, assumed to be a central processing unit, a memory, a communication card, and fans. Respective images 204, 206, 208, and 210 of these sub-components are shown schematically in FIG. 4A, and in embodiments of the present invention, operator 28 may determine properties of all sub-components 203, as described above. Typically, computer 40A comprises other sub-components, such as a power supply and/or one or more hard disks, the images of which, for clarity, are not shown in FIG. 4A.

The zoom mode may be advantageously used to inspect more closely, and/or to modify a property of, one of the sub-components of a component of console 34 such as computer 40A. An example of how the zoom mode may operate is described herein:

Image 40AI may indicate that computer 40A is not operating within, or is operating too close to, assigned parameter boundaries of the computer. For example, the rate of I/O operations of computer 40A may be significantly below a previously established average for the computer. The indication may be provided by changing the color of image 40AI, generally as has been described above with reference to FIG. 3G. Operator 28 generates an enlarged image of computer 40A by entering the visual zoom mode, selecting image 40AI, and generating enlarged image 202. The operator is then able to interrogate the memory of computer 40A by applying pointing device 26 to image 206. The interrogation generates relevant information regarding the sub-component, such as, as shown in FIG. 4A, a window 214 showing utilization of the memory.

The zoom mode may be implemented to operate on some of the sub-components of console 34, to display further detail and properties of these sub-components. For example, image 202 displays a first image 208 of the communication card of computer 40A, and the card may be interrogated substantially as described above for the memory, by operator 28 applying pointing device 26 to image 208. (For clarity, since the results of the interrogation are of the same general form as window 214, the card interrogation results are not shown in FIG. 4A.) Applying the zoom mode to image 208 generates a further enlarged image 228 of the communication card, showing images 230, 232, and 234, of three ports of the card. Each port may be interrogated; by way of example, a window 238 shows the result of interrogating the uppermost port of the communication card.

FIGS. 4B and 4C illustrate operation of GUI 10 in a multi-system mode. As illustrated in a diagram 300, GUI 10 may show miniature realistic images 301, 302, 304 and 306 of respective different sub-systems 22 operating in system 20 (FIG. 1); the sub-systems are herein assumed to operate in consoles other than console 34, having respective console identifiers 106, 106, 180, and 220. As described in more detail below, there are two sub-systems in console 106. To generate diagram 300, operator 28 operates in a multi-system mode which displays images 301, 302, 304 and 306; the images enable the operator to see parameters and characteristics of some or all of sub-systems 22 so displayed. Although images 301, 302, 304, and 306 are miniaturized, they are typically configured to provide at least some of the information that is available for larger images of each of the sub-systems, such as the information described in the examples above. By way of example, image 304 of sub-system 180 indicates, by a part being colored red, shown as shading 305 in the diagram, that one of the disks of the sub-system has failed.

In the multi-system mode, operator 28 may generate an image, herein termed an enlarged image, of each of the sub-systems, the enlarged image having substantially the same size on display 12 as that of one of the images in FIG. 3L. Operator 28 typically generates the enlarged image using pointing device 26. By way of example, diagram 300 shows such an enlarged image 308 for a first sub-system in console 106, corresponding to image 301. Enlarged image 308 has substantially the same properties as the images described herein. Thus, for example, operator 28 is able to apply operations similar to those described above with respect to FIGS. 3K and 3L, and/or to use the visual zoom mode described above with respect to FIG. 4A to inspect components and sub-components of the first sub-system.

As exemplified by images 301 and 302, at least some of sub-systems 22 (FIG. 1) may also be configured within the same console. In the case of more than one sub-system in the same console, the multi-system mode displays multiple miniaturized images of the console, each of the images showing the components of its respective sub-system. As is described above, operator 28 may generate an enlarged image of each sub-system, and the enlarged image also has the properties described above. FIG. 4C illustrates, in a diagram 350, an enlarged image 352 showing components of a second sub-system in console 106, corresponding to image 302.

Figure 4D:
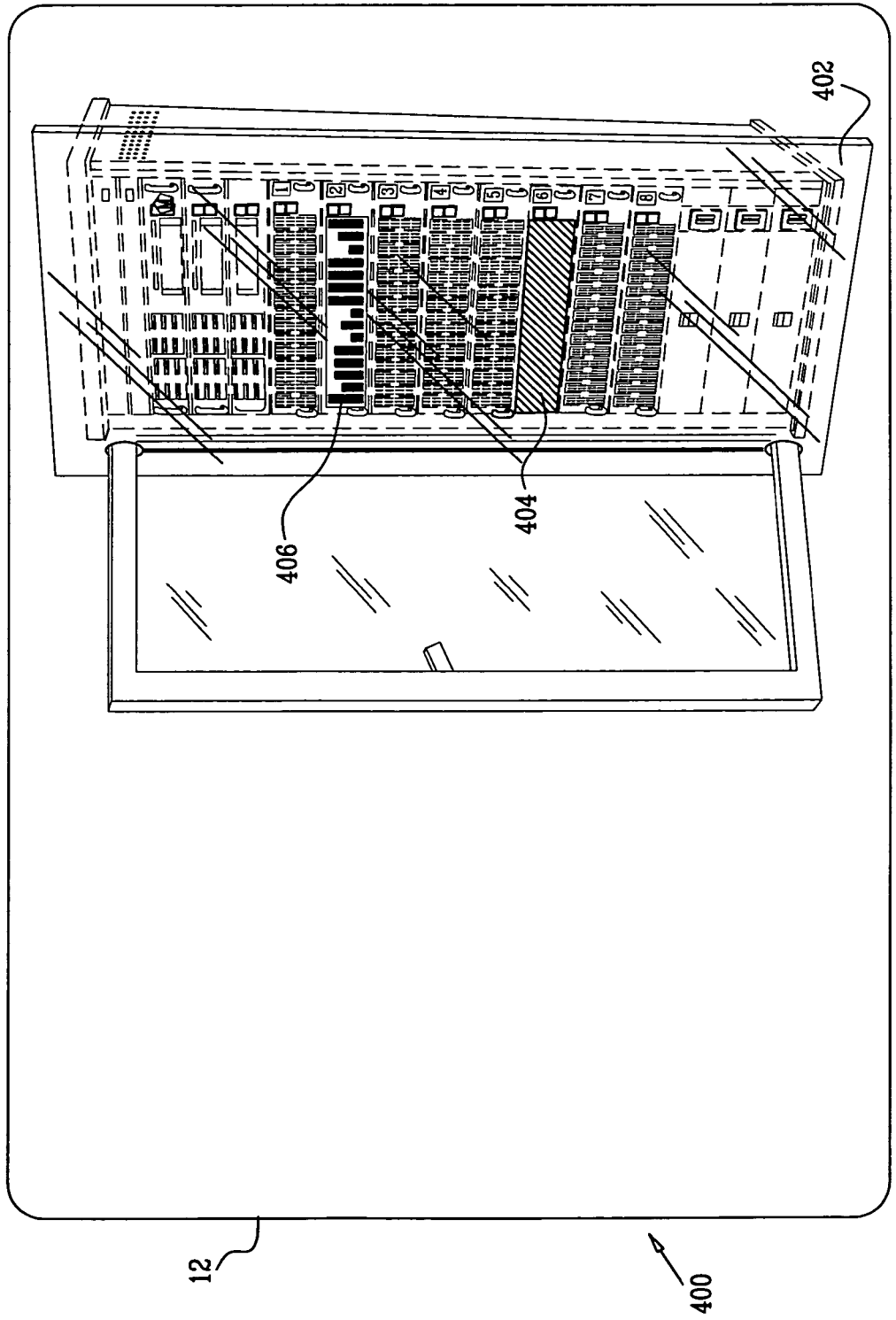

FIG. 4D illustrates in a diagram 400 the operation of GUI 10 in an overlay mode. In the overlay mode, operator 28 generates a semi-transparent overlay 402, behind which features of an imaged sub-system are visible. The imaged sub-system is herein, by way of example, assumed to be an image of the console 34 corresponding to FIG. 3E. Overlay 402 enables operator 28 to display further properties of the imaged sub-system while maintaining the visibility of the underlying elements. Typically, features on the overlay and on the underlying image are selected using different operations of pointing device 26, such as clicking a left or a right mouse button. Alternatively or additionally, the different features may be selected using a menu.

As shown in diagram 400, underlying elements shown in diagram 80 are still visible. For example, an image 404 of bank 6 may be colored red, indicated in FIG. 4D by shading, to show that the bank has failed. In the overlay mode this remains visible; in addition, operator 28 may display on overlay 402 further properties of the sub-system. By way of example, diagram 400 illustrates the loading vs. time of bank 2 of the sub-system, displayed as a bar graph 406. It will be appreciated that other convenient graphical and/or textual displays, such as line graphs, may be incorporated into overlay 402; all such displays known in the art are assumed to be comprised in the present invention.

Figure 4E:
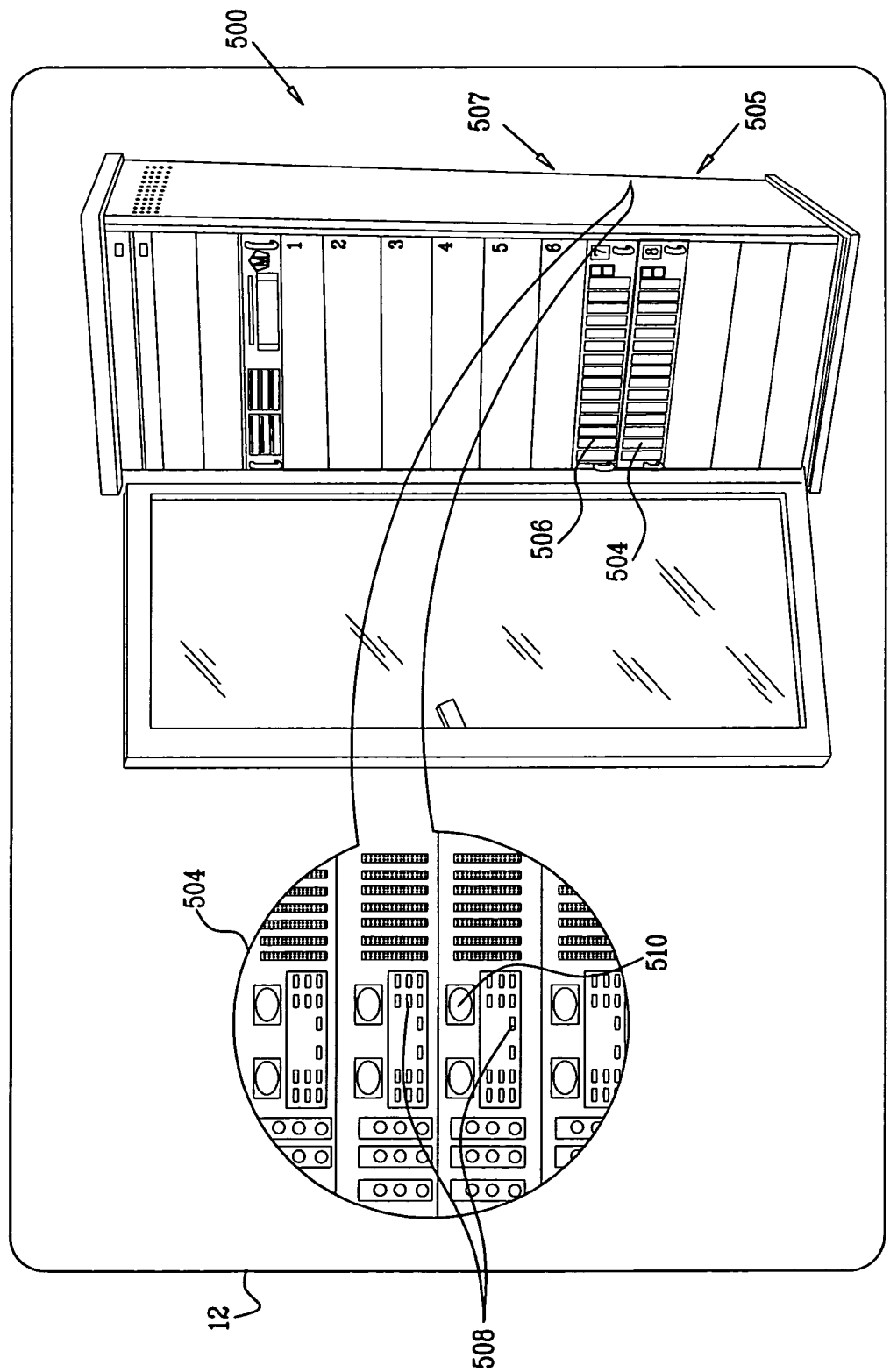
Figure 4F:
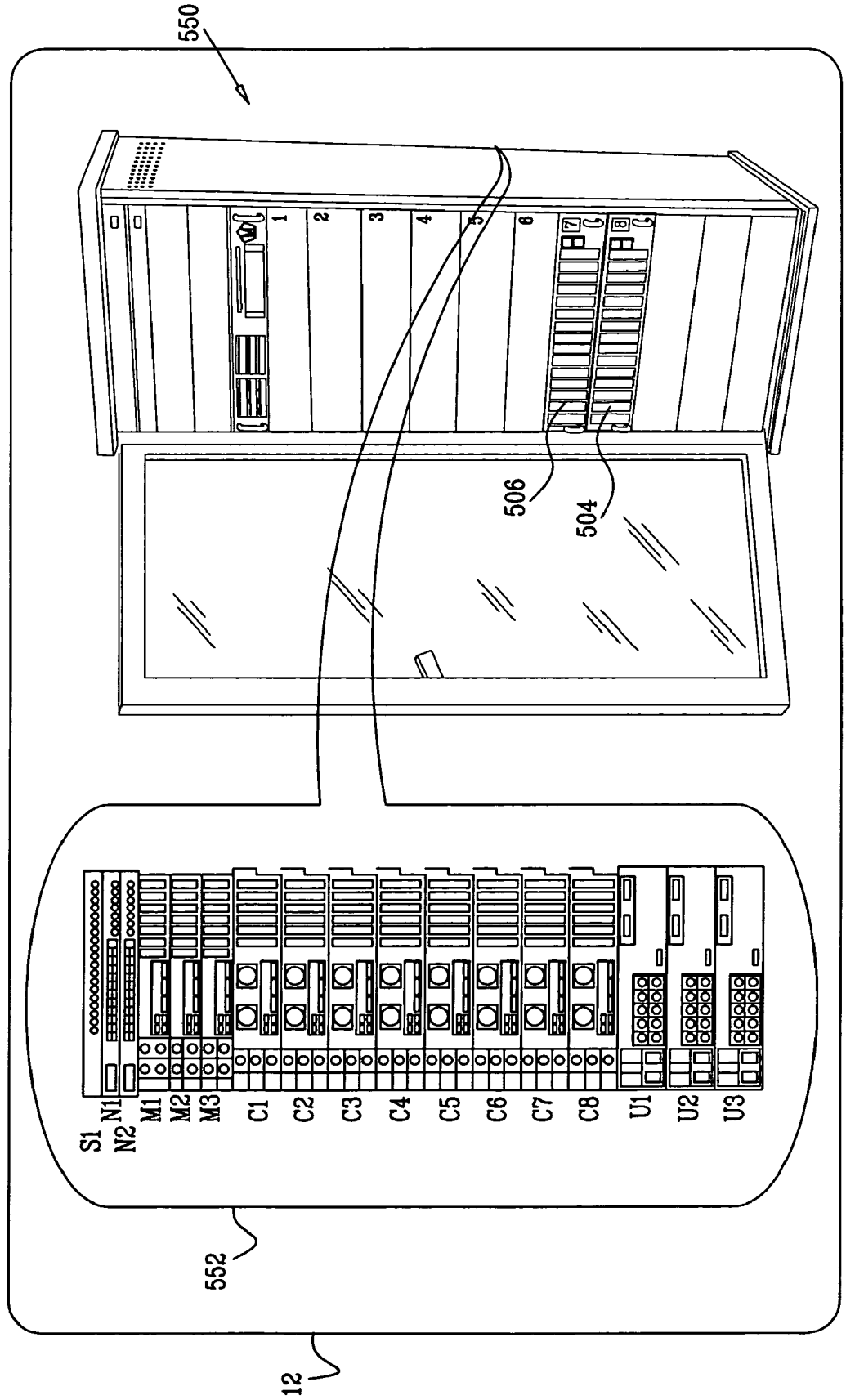

FIGS. 4E and 4F illustrate in a diagram 500 and a diagram 550 the operation of GUI 10 in a hidden view mode. Since console 34 is a three-dimensional object, image 30 of the console typically does not show all parts of the console that are physically visible to operator 28, since the operator is able to view the console from a number of different perspectives. The different views that operator 28 can see of console 34 include front, rear, left, and right sides of the console. In the hidden view mode of operation, operator 28 is able to generate one or more further images of console 34 showing sections of the console that are not shown in image 30.

Diagram 500 illustrates an image 502 generated when operator 28 operates GUI 10 in a first aspect of the hidden view mode. In the first aspect, operator selects a section 504 of the image of the console, and the system control unit generates image 502 of the back of the section. Typically, image 502 has the same characteristics as the interactive images described above, so that using device 26 the operator is able to view characteristics of, and/or perform operations on the back of, the element of console 34 corresponding to the section. For example, section 504 may be the image of a cache 505 in console 34, and cache 505 may be coupled internally to a cache 507 in the console. The coupling may be shown visually in image 502 by light images 508, and may be physically activated or de-activated by a switch at the back of the cache. By clicking on an image 510 of the switch, operator 28 may activate and de-activate the switch, the operations being shown as having been effected by changes in images 508. These changes correspond to actual changes of the lights on the back of cache 505 which would be caused by operating the physical switch.

In a second aspect of the hidden view mode, illustrated in diagram 550 (FIG. 4F), operator 28 is able to generate an image 552 of the complete back of console 34. Image 552 shows the activity of all the operating elements of the console. In addition to showing the activity of the elements, operator 28 is able to view characteristics of, and/or perform operations on the back of, elements visible in image 552, generally as described above for image 502.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

We claim:

1. A method for interfacing with a storage system having a plurality of elements, the elements having a visible relationship with each other, and being coupled to a system control unit including a display, the method comprising:

drawing an image of the elements on the display, the image showing the visible relationship;

modifying an appearance of one of the elements in the image to represent a property of the element;

in response to a first input from a user of the storage system to the system control unit, drawing an enlarged image of the element and representing the property in the enlarged image; and in response to a second input from a user of the storage system to the system control unit with respect to the enlarged image, representing a further property of the element in the enlarged image.

2. The method according to claim 1, wherein the image is a realistic image of the storage system, and wherein the enlarged image is a realistic image of the one element.

3. The method according to claim 1, wherein representing the property comprises displaying text describing the property on the display.

4. A method for interfacing with a storage system having a first plurality of sub-systems, each of the sub-systems having respective second pluralities of elements having respective visible relationships with each other, each of the sub-systems being coupled to a system control unit including a display, the method comprising:

drawing an image of each of the sub-systems on the display, each such image having the respective second plurality of elements and showing the respective visible relationships;

in response to a first input from a user of the storage system, selecting the image of a given one of the sub-systems, so as to form a selected image;

enlarging the selected image to form an enlarged image of the given sub-system;

modifying an appearance of one of the elements in the enlarged image to represent a property of the element; and in response to a second input from the user to the system control unit, making a change in the property of the element and representing the change in the appearance of the element.

5. The method according to claim 4, wherein the image of each of the sub-systems is a realistic image.

6. A method for interfacing with a storage system having a plurality of elements, the elements having a visible relationship with each other, and being coupled to a system control unit including a display, the method comprising:

drawing an image of the elements on the display, the image showing the visible relationship;

modifying an appearance of one of the elements in the image to represent a first property of the element; and in response to an input from the user, drawing an at least partly transparent overlay on the image of the elements and drawing on the overlay a representation of a second property of the element.

7. The method according to claim 6, wherein the representation comprises a graphical plot of the property.

8. The method according to claim 6, and comprising drawing on the overlay the representation of a third property of a second of the elements.

9. A method for interfacing with a storage system having a plurality of elements and a first side having a first visible relationship of the elements with each other and a second side having a second visible relationship of the elements with each other, the storage system being coupled to a system control unit including a display, the method comprising:

drawing a first image of the first side on the display, the first image showing the first visible relationship of the elements;

modifying a first appearance of a given one of the elements in the first image to represent a first property of the element;

in response to an input from a user of the storage system to the system control unit, drawing a second image of the second side on the display, the second image showing the second visible relationship of the elements; and modifying a second appearance of the given element in the second image to represent a second property of the element.

10. The method according to claim 9, wherein the second side of the storage system is invisible to the user at a time when the first side is visible to the user.

11. Apparatus for interfacing with a storage system having a plurality of elements, the elements having a visible relationship with each other, and being coupled to a system control unit including a display, the apparatus comprising:

a processor, which is adapted to:

draw an image of the elements on the display, the image showing the visible relationship, modify an appearance of one of the elements in the image to represent a property of the element, in response to a first input from a user of the storage system to the system control unit, draw an enlarged image of the element and represent the property in the enlarged image, and in response to a second input from a user of the storage system to the system control unit with respect to the enlarged image, represent a further property of the element in the enlarged image.

12. Apparatus for interfacing with a storage system having a plurality of elements, the elements having a visible relationship with each other, and being coupled to a system control unit including a display, the apparatus comprising:

a processor which is adapted to:

draw an image of the elements on the display, the image showing the visible relationship, modify an appearance of one of the elements in the image to represent a first property of the element, and in response to an input from the user, draw an at least partly transparent overlay on the image of the elements and draw on the overlay a representation of a second property of the element.

* * * * *